US010936578B2

(12) United States Patent
Lee et al.

(10) Patent No.: US 10,936,578 B2
(45) Date of Patent: Mar. 2, 2021

(54) CLIENT-DRIVEN COMMIT OF DISTRIBUTED WRITE TRANSACTIONS IN A DATABASE ENVIRONMENT

(71) Applicant: SAP SE, Walldorf (DE)

(72) Inventors: Juchang Lee, Seoul (KR); Deok Koo Kim, Seoul (KR); Chang Gyoo Park, Seoul (KR); Nosub Sung, Seoul (KR)

(73) Assignee: SAP SE, Walldorf (DE)

( * ) Notice: Subject to any disclaimer, the term of this patent is extended or adjusted under 35 U.S.C. 154(b) by 723 days.

(21) Appl. No.: 15/611,156

(22) Filed: Jun. 1, 2017

(65) Prior Publication Data
US 2018/0349430 A1 Dec. 6, 2018

(51) Int. Cl.
G06F 16/23 (2019.01)
G06F 16/28 (2019.01)

(52) U.S. Cl.
CPC .......... *G06F 16/2365* (2019.01); *G06F 16/28* (2019.01)

(58) Field of Classification Search
None
See application file for complete search history.

(56) References Cited

U.S. PATENT DOCUMENTS

| | | | |
|---|---|---|---|
| 7,305,421 B2 | 12/2007 | Cha et al. | |
| 7,478,400 B1 * | 1/2009 | Banerjee | G06F 16/10 719/313 |
| 8,442,962 B2 | 5/2013 | Lee et al. | |
| 8,700,660 B2 | 4/2014 | Lee et al. | |
| 8,768,927 B2 | 7/2014 | Yoon et al. | |
| 8,782,100 B2 | 7/2014 | Yoon et al. | |
| 8,793,276 B2 | 7/2014 | Lee et al. | |
| 8,918,436 B2 | 12/2014 | Yoon et al. | |
| 8,935,205 B2 | 1/2015 | Hildenbrand et al. | |
| 9,009,182 B2 | 4/2015 | Renkes et al. | |
| 9,037,677 B2 | 5/2015 | Lee et al. | |
| 9,063,969 B2 | 6/2015 | Lee et al. | |
| 9,098,522 B2 | 8/2015 | Lee et al. | |
| 2003/0061537 A1 | 3/2003 | Cha et al. | |
| 2008/0065670 A1 | 5/2008 | Cha et al. | |
| 2012/0084273 A1 | 4/2012 | Lee et al. | |
| 2012/0084274 A1 | 4/2012 | Renkes et al. | |
| 2012/0102006 A1 * | 4/2012 | Larson | G06F 16/1865 707/703 |

(Continued)

OTHER PUBLICATIONS

Aulbach et al., "Extensibility and Data Sharing in Evolving Multi-Tenant Databases," in 2011 IEEE 27th International Conference on Data Engineering. IEEE, pp. 99-110 (2011).

(Continued)

*Primary Examiner* — Giuseppi Giuliani
(74) *Attorney, Agent, or Firm* — Klarquist Sparkman, LLP

(57) ABSTRACT

Technologies are described for facilitating transaction processing in a distributed database environment. A database client sends database operations to a slave node, which mediates execution of the transaction. A connection between the database client and the slave node is associated with an identifier, and the transaction has an identifier. The database client sends a commit request to a master node over a network connection between the master node and the database client. The commit request includes the transaction identifier. The commit request can also include an indication of database nodes executing operations in the transaction.

20 Claims, 14 Drawing Sheets

(56) References Cited

U.S. PATENT DOCUMENTS

| | | |
|---|---|---|
| 2012/0166407 A1 | 6/2012 | Lee et al. |
| 2012/0167098 A1 | 6/2012 | Lee et al. |
| 2013/0124475 A1 | 5/2013 | Hildenbrand et al. |
| 2013/0166534 A1 | 6/2013 | Yoon et al. |
| 2013/0166553 A1 | 6/2013 | Yoon et al. |
| 2013/0166554 A1 | 6/2013 | Yoon et al. |
| 2013/0275457 A1 | 10/2013 | Lee et al. |
| 2013/0275467 A1 | 10/2013 | Lee et al. |
| 2013/0275468 A1 | 10/2013 | Lee et al. |
| 2013/0275550 A1 | 10/2013 | Lee et al. |
| 2013/0290282 A1 | 10/2013 | Faerber et al. |
| 2013/0304714 A1 | 11/2013 | Lee et al. |
| 2014/0122439 A1 | 5/2014 | Faerber et al. |
| 2014/0122452 A1 | 5/2014 | Faerber et al. |
| 2014/0136473 A1 | 5/2014 | Faerber et al. |
| 2014/0136788 A1 | 5/2014 | Faerber et al. |
| 2014/0149353 A1 | 5/2014 | Lee et al. |
| 2014/0149368 A1 | 5/2014 | Lee et al. |
| 2014/0149527 A1 | 5/2014 | Lee et al. |
| 2014/0156619 A1 | 6/2014 | Lee et al. |
| 2014/0222418 A1 | 8/2014 | Richtarsky et al. |
| 2014/0244628 A1 | 8/2014 | Yoon et al. |
| 2014/0297686 A1 | 10/2014 | Lee et al. |
| 2014/0304219 A1 | 10/2014 | Yoon et al. |
| 2015/0074082 A1 | 5/2015 | Yoon et al. |
| 2015/0149409 A1 | 5/2015 | Lee et al. |
| 2015/0149413 A1 | 5/2015 | Lee et al. |
| 2015/0149426 A1 | 5/2015 | Kim et al. |
| 2015/0149704 A1 | 5/2015 | Lee et al. |
| 2015/0149736 A1 | 5/2015 | Kwon et al. |
| 2015/0178343 A1 | 6/2015 | Renkes et al. |
| 2015/0242400 A1 | 8/2015 | Bensberg et al. |
| 2015/0242451 A1 | 8/2015 | Bensberg et al. |
| 2015/0261805 A1 | 9/2015 | Lee et al. |
| 2016/0065498 A1* | 3/2016 | Harper .................. H04L 47/826 709/223 |

OTHER PUBLICATIONS

Bailis et al., "Hat, Not Cap: Towards Highly Available Transactions", in Proceedings of the 14th USENIX Conference on Hot Topics in Operating Systems, pp. 24, USENIX Association (2013).
Bailis et al., "Scalable Atomic Visibility with Ramp Transactions," in Proceedings of the 2014 ACM SIGMOD International Conference on Management of Data. ACM, pp. 27-38 (2014).
Barber et al., "In-Memory Blu Acceleration in IBM's db2 and dashdb: Optimized for Modern Workloads and Hardware Architectures," in Proceedings of the 2015 International Conference on Data Engineering (ICDE). IEEE (2015).
Berenson et al., "A Critique of Ansi SQL Isolation Levels," ACM SIGMOD Record, vol. 24, No. 2, pp. 1-10, (1995).
Bernstein et al., "Concurrency Control and Recovery in Database Systems," (1987).
Bernstein et al., "Optimizing Optimistic Concurrency Control for Tree-Structured, Log-Structured Databases," in Proceedings of the 2015 ACM SIGMOD International Conference on Management of Data. ACM, pp. 1295-1309 (2015).
Binnig et al., "Distributed Snapshot Isolation: Global Transactions Pay Globally, Local Transactions Pay Locally," The International Journal on Very Large Data Bases, vol. 23, No. 6, pp. 987-1011 (2014).
Cha et al., "An Extensible Architecture for Main-Memory Real-Time Storage Systems", RTCSA : 67-73 (1996).
Cha et al., "An Object-Oriented Model for FMS Control", J. Intelligent Manufacturing 7(5): 387-391 (1996).
Cha et al., "Cache-Conscious Concurrency Control of Main-Memory Indexes on Shared-Memory Multiprocessor Systems", VLDB: 181-190 (2001).
Cha et al., "Efficient Web-Based Access to Multiple Geographic Databases Through Automatically Generated Wrappers", WISE : 34-41 (2000).
Cha et al., "Interval Disaggregate: A New Operator for Business Planning", PVLDB 7(13): 1381-1392 (2014).
Cha et al., "Kaleidoscope: A Cooperative Menu-Guided Query Interface", SIGMOD Conference : 387 (1990).
Cha et al., "Kaleidoscope Data Model for an English-like Query Language", VLDB : 351-361 (1991).
Cha et al., "MEADOW: A Middleware for Efficient Access to Multiple Geographic Databases Through OpenGIS Wrappers", Softw., Pract. Exper. 32(4): 377-402 (2002).
Cha et al., "Object-Oriented Design of Main-Memory DBMS for Real-Time Applications", RTCSA : 109-115 (1995).
Cha et al., "Paradigm Shift to New DBMS Architectures: Research Issues and Market Needs", ICDE: 1140 (2005).
Cha et al., "P*TIME: Highly Scalable OLTP DBMS for Managing Update-Intensive Stream Workload", VLDB: 1033-1044 (2004).
Cha et al., "Xmas: An Extensible Main-Memory Storage System", CIKM : 356-362 (1997).
Chang et al., "Bigtable: A Distributed Storage System for Structured Data," ACM Transactions on Computer Systems (TOCS), vol. 26, No. 2, p. 4, (2008).
Chaudhuri et al., "An Overview of Data Warehousing and OLAP Technology," ACM SIGMOD Record, vol. 26, No. 1, pp. 65-74 (1997).
Cooper et al., "Pnuts: Yahoo!' s Hosted Data Serving Platform," Proceedings of the VLDB Endowment, vol. 1, No. 2, pp. 1277-1288 (2008).
DeCandia et al., "Dynamo: Amazon's Highly Available Key-Value Store," ACM SIGOPS Operating Systems Review, vol. 41, No. 6, pp. 205-220 (2007).
DeWitt et al., "Parallel Database Systems: the Future of High Performance Database Systems," Communications of the ACM, vol. 35, No. 6, pp. 85-98 (1992).
Diaconu et al., "Hekaton: SQL Server's Memory-Optimized OLTP Engine," in Proceedings of the 2013 ACM SIGMOD International Conference on Management of Data. ACM, pp. 1243-1254 (2013).
Du et al., "Clock-Si: Snapshot Isolation for Partitioned Data Stores Using Loosely Synchronized Clocks," in Reliable Distributed Systems (SRDS), 2013 IEEE 32nd International Symposium on. IEEE, pp. 173-184 (2013).
Farber et al., SAP HANA Database: Data Management for Modern Business Applications. SIGMOD Record 40(4): 45-51 (2011).
Farber et al., "The SAP HANA Database—An Architecture Overview." IEEE Data Eng. Bull., vol. 35, No. 1, pp. 28-33 (2012).
Fekete et al., "Making Snapshot Isolation Serializable," ACM Transactions on Database Systems (TODS), vol. 30, No. 2, pp. 492-528 (2005).
Hwang et al., "Performance Evaluation of Main-Memory R-tree Variants", SSTD: 10-27 (2003).
Kallman et al., "Hstore: A High-Performance, Distributed Main Memory Transaction Processing System," Proceedings of the VLDB Endowment, vol. 1, No. 2, pp. 1496-1499 (2008).
Kemper et al., "Hyper: A Hybrid OLTP & OLAP Main Memory Database System Based on Virtual Memory Snapshots," in Data Engineering (ICDE), 2011 IEEE 27th International Conference on. IEEE, pp. 195-206 (2011).
Kim et al., "Optimizing Multidimensional Index Trees for Main Memory Access", SIGMOD Conference: 139-150 (2001).
Kung et al., "On Optimistic Methods for Concurrency Control," ACM Transactions on Database Systems (TODS), vol. 6, No. 2, pp. 213-226 (1981).
Lahiri et al., "Cache Fusion: Extending Shared-Disk Clusters with Shared Caches," in VLDB, vol. 1, pp. 683-686 (2001).
Lahiri et al., "Oracle Timesten: An In-Memory Database for Enterprise Applications." IEEE Data Eng. Bull., vol. 36, No. 2, pp. 6-13 (2013).
Larson et al., "High-Performance Concurrency Control Mechanisms for Main-Memory Databases," Proceedings of the VLDB Endowment, vol. 5, No. 4, pp. 298-309, (2011).
Lee et al., "A Performance Anomaly Detection and Analysis Framework for DBMS Development", IEEE Trans. Knowl. Data Eng. 24(8): 1345-1360 (2012).

(56) References Cited

OTHER PUBLICATIONS

Lee et al., "Differential Logging: a Commutative and Associative Logging Scheme for Highly Parallel Main Memory Databases", ICDE 173-182 (2001).
Lee et al., "High-Performance Transaction Processing in SAP HANA." IEEE Data Eng. Bull., vol. 36, No. 2, pp. 28-33 (2013).
Lee et al., "SAP HANA Distributed In-Memory Database System: Transaction, Session, and Metadata Management," in Data Engineering (ICDE), 2013 IEEE 29th International Conference on. IEEE, pp. 1165-1173 (2013).
Neumann et al., "Fast Serializable Multi-Version Concurrency Control for Main-Memory Database Systems," in Proceedings of the 2015 ACM SIGMOD International Conference on Management of Data. ACM, pp. 677-689 (2015).
Pandis et al., "Dataoriented Transaction Execution," Proceedings of the VLDB Endowment, vol. 3, No. 1-2, pp. 928-939 (2010).
Park et al., Xmas: An Extensible Main-Memory Storage System for High-Performance Applications. SIGMOD Conference : 578-580 (1998).
Plattner, H., "A Common Database Approach for OLTP and OLAP Using an In-Memory Column Database", in Proceedings of the 2009 ACM SIGMOD International Conference on Management of Data, pp. 1-2. ACM (2009).
Qiao et al., "On Brewing Fresh Espresso: Linkedin's Distributed Data Serving Platform," in Proceedings of the 2013 ACM SIGMOD International Conference on Management of Data. ACM, pp. 1135-1146 (2013).
Roy et al., "The Homeostasis Protocol: Avoiding Transaction Coordination Through Program Analysis," in Proceedings of the 2015 ACM SIGMOD International Conference on Management of Data. ACM, pp. 1311-1326 (2015).
Sikka et al. "Efficient Transaction Processing in SAP HANA Database: the End of a Column Store Myth", in Proceedings of the 2012 ACM SIGMOD International Conference on Management of Data, pp. 731-742. ACM (2012).
Tu et al., "Speedy Transactions in Multicore In-Memory Databases," in Proceedings of the Twenty-Fourth ACM Symposium on Operating Systems Principles. ACM, pp. 18-32 (2013).
Vogels, W., "Eventually Consistent," Communications of the ACM, vol. 52, No. 1, pp. 40-44 (2009).
Weikum et al., "Fundamentals of Transactional Information Systems: Theory, Algorithms, and the Practice of Concurrency Control and Recovery," (2001).
Yoo et al., "A Middleware Implementation of Active Rules for ODBMS", DASFAA : 347-354 (1999).
Yoo et al., "Integrity Maintenance in a Heterogeneous Engineering Database Environment", Data Knowl. Eng. 21(3): 347-363 (1997).
Zamanian et al., "Locality-Aware Partitioning in Parallel Database Systems," in Proceedings of the 2015 ACM SIGMOD International Conference on Management of Data. ACM, pp. 17-30 (2015).
"SQL Processing Concepts," retrieved from http://www.helsinki.fi/~atkk_klp/oradoc/DOC/server/doc/A48506/sqlconce.htm, on or before May 2017, 6 pages.
Sharma, Manish, "Introduction to PL/SQL Cursors in Oracle Database," retrieved from http://www.rebellionrider.com/pl-sql-tutorials/database-cursors/introduction-to-cursors-in-oracle-database-by-manish-sharma.htm#.WScc5Hnwv9K, on or before May 2017, 12 pages.
"What is a Checksum and How to Calculate a Checksum," retrieved from http://www.online-tech-tips.com/cool-websites/what-is-checksum/, on or before May 2017, 6 pages.
"Sessions and transaction," retrieved from https://developer.jboss.org/wiki/SessionsAndTransactions?_sscc=t, on or before May 2017, 10 pages.
"What is a database session?" retrieved from https://stackoverflow.com/questions/10521947/what-is-a-database-session, on or before May 2017, 3 pages.
"SAP HANA—SQL Session Management Statements," retrieved from http://www.sapstudent.com/hana/sap-hana-sql-session-management-statements, on or before May 2017, 6 pages.

\* cited by examiner

CLIENT-DRIVEN COMMIT OF DISTRIBUTED WRITE TRANSACTIONS IN A DATABASE ENVIRONMENT

FIELD

The present disclosure generally relates to executing and committing transactions in a distributed database environment. Particular implementations provide improved performance by sending commit requests from a database client to a master node rather than to slave nodes.

BACKGROUND

Database performance can be enhanced by distributing information, such as source tables, among multiple hosts. For example, a number of hosts may store different tables in the database system, or tables can be partitioned among multiple hosts. The ability to distribute a database system among multiple hosts can provide opportunities to increase system performance, such as by distributing workloads among CPUs located at the different hosts, rather than relying on the capabilities of a single host.

However, distributed database systems can present challenges in ensuring that database operations are carried out in a way that provides queries with accurate data, but without requiring so much coordination between hosts that the performance of the distributed database system is significantly adversely affected. In particular, protocols to commit database transactions in a distributed database environment can require multiple communications between a node that acts as a coordinator node for the transaction commit and one or more nodes that act as worker nodes. Accordingly, room for improvement exists in the operation of distributed database environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for processing database transactions, including their execution and commit, in a distributed database environment. The disclosed innovations can speed transaction execution and commit, as well as reduce the use of network and processing resources. The distributed database system includes a database client, a master (or coordinator) node, and one or more slave (or worker) nodes. Typically, the distributed database system includes a plurality of slave nodes.

According to one aspect, the coordinator node receives a commit request from the database client. The commit request includes a transaction identifier. The transaction identifier is associated with a connection between the database client and a worker node, where the worker node mediates execution of database operations in the transaction. The coordinator node sends precommit requests to the first and second worker nodes. The coordinator node marks the transaction as committed, and sends commit requests to the first and second worker nodes.

In another aspect, a database client establishes a network connection with a first slave node. The database client sends a database operation to be executed to the first slave node. The database client sends a commit request for the transaction to the master node over a network connection between the database client and the master node.

In a further aspect, a slave node receives a database operation from a database client. The slave node causes the database operation to be executed. The slave node receives a request from the master node to commit the transaction. The slave node does not receive a commit request for the transaction directly from the database client.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
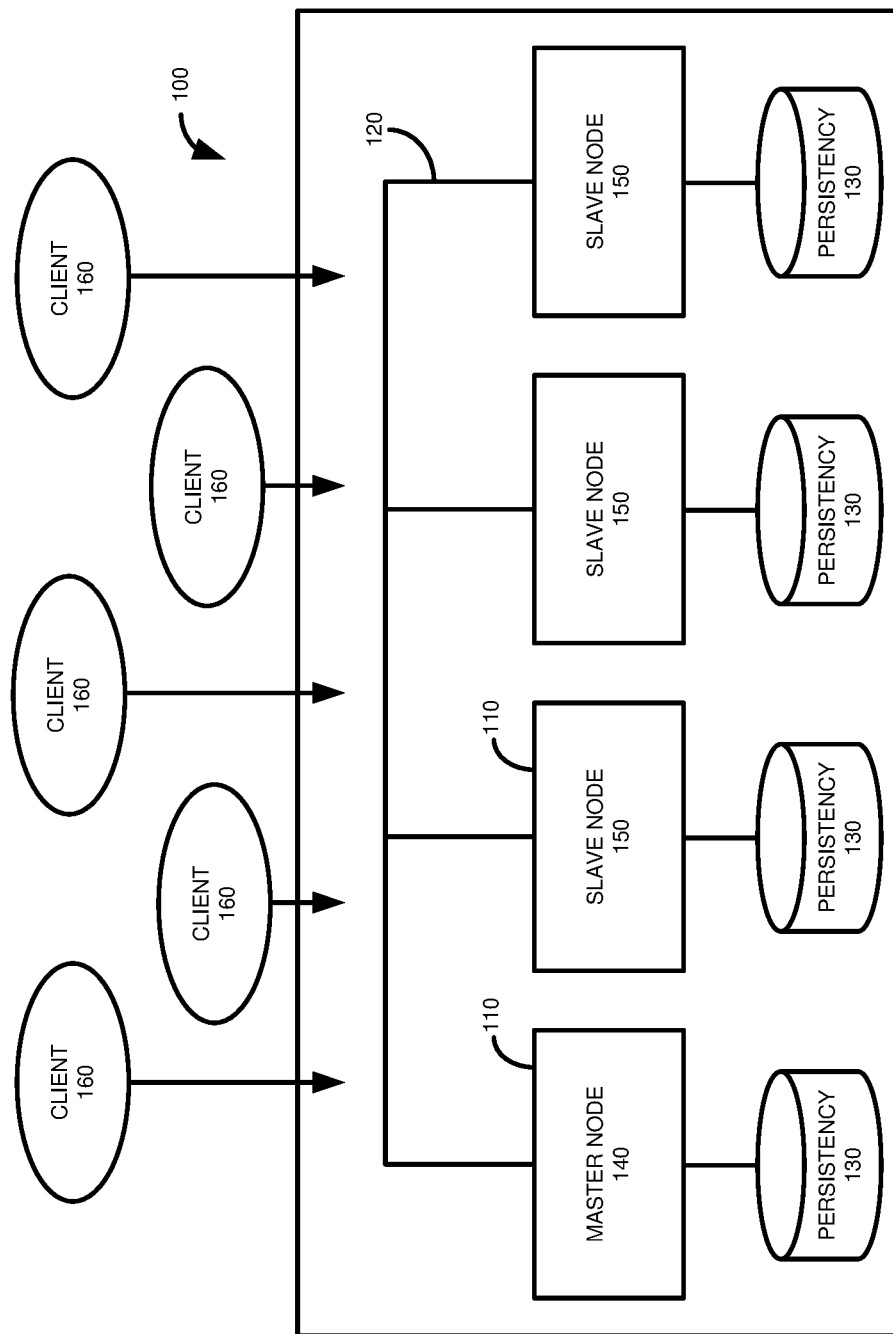
FIG. 1 is a diagram schematically depicting a distributed database environment having a master node and a plurality of slave nodes.

Database performance can be enhanced by distributing information, such as source tables, among multiple hosts. For example, a number of hosts may store different tables in the database system, or tables can be partitioned among multiple hosts. The ability to distribute a database system among multiple hosts can provide opportunities to increase system performance, such as by distributing workloads among CPUs located at the different hosts, rather than relying on the capabilities of a single host.

However, distributed database systems can present challenges in ensuring that database operations are carried out in a way that provides queries with accurate data, but without requiring so much coordination between hosts that the performance of the distributed database system is significantly adversely affected. In particular, protocols to commit database transactions in a distributed database environment can require multiple communications between a node that acts as a coordinator node for the transaction commit and one or more nodes that act as worker nodes. These multiple communications can delay transaction processing, both because of the time taken to transmit the communications over a network and the time taken to process the communications.

In particular, in typical commit protocols, a database client can issue a commit request to a worker node, rather than directly to the coordinator node. For instance, the database client may send a commit request to the worker node after having sent one or more write transactions (e.g., a data manipulation language (DML) statements that update, insert, or delete a database record) to the worker node. In this case, the worker node sends a communication to the coordinator node to begin the commit process, introducing a delay in the commit process corresponding to the time needed to generate the request at the worker node, send the request to the coordinator node over a network connection, and process the request at the coordinator node. Accordingly, room for improvement exists in the operation of distributed database environments.

The present disclosure provides innovations in commit protocols useable in distributed database environments. In particular, the innovations can provide for faster processing of distributed database transactions by having a database client send a commit request for a distributed write transaction directly to the coordinator node, rather than sending the commit request to a worker node.

According to one aspect, a database client directly instructs a coordinator node to commit a transaction can be facilitated by using a connection between the database client and the coordinator node for the transaction. The commit request can be sent over the connection from the database client to the coordinator node. If the connection does not exist, the database client can establish a connection with the coordinator node in order to send the commit request.

In some cases, when a connection is established between a database client and a database system node, the connection is associated with one or more, typically new, identifiers, such as an identifier for a session between the database client and the database node, and a transaction identifier associated with the connections or session. In particular implementations, the connection can establish a session between the database client and the database system, with the communications being routed through a particular node of the database system. The session can be associated with one or more parameters (e.g., authorization information, cached data) that can be used with multiple operations (e.g., read operations, such as queries, or transactions involving one or more DML statements), and optionally multiple transactions, with the database system.

Typically, when a commit operation is carried out for a transaction, the commit request is associated with the transaction identifier of the current connection (or session). Thus, if the coordinator node directly received the commit request from the database client, the transaction identifier (of the client-coordinator connection) would not match the transaction identifier of the transaction to be committed (of the client-worker connection). Accordingly, a protocol of the present disclosure can include providing that a commit request is explicitly given the transaction identifier of the transaction to be committed as an argument, and that argument can be supplied to the coordinator node by a database client as part of a commit request.

Typical protocols for executing and committing distributed transactions can also introduce delay because the coordinator node typically is notified of each worker node participating in the commit of a transaction when an operation in the transaction is carried out at a worker node. This is done so that the coordinator node knows which worker nodes need to be involved in a commit operation. In some cases, for a particular transaction, the coordinator node is notified the first time an operation is executed at a new worker node, but optionally may not be notified for subsequent operations at the worker node. That is, once a worker node is in the list of worker nodes associated with a particular transaction, the coordinator node does not need to be notified that additional operations were carried out at a node already in the list maintained by the coordinator node. In other cases, the coordinator node is notified each time an operation is carried out at a worker node, even if the coordinator node already received a notification for that worker node.

This notification process is typically carried out before the operation is executed at the worker node, which can introduce additional delay associated with the working node sending the notification and waiting for an acknowledgement. The present disclosure provides innovations that can reduce the delays associated with maintaining a list of nodes involved in a transaction and informing the coordinator node regarding such nodes.

In one implementation, the coordinator node is notified of each operation at a worker node (or, in some cases, at least for the first operation at a particular worker node for a particular transaction), but the operation is executed at the worker node without waiting for the list to be updated at the coordinator node (e.g., the notifying is carried out asynchronously). In a specific example, the database client notifies the coordinator node of the identity of the worker node associated with an operation when the client sends the operation to the worker node for execution. In another example, the worker node notifies the coordinator node of the identity of the worker node for an operation but does not wait for an acknowledgement before executing the operation (or causing the operation to be executed).

In another implementation, the database client maintains a list of worker nodes involved in a transaction. The list of worker nodes can be sent to the coordinator node when the database client issues a commit request, such as a commit request issued directly to the coordinator node, as described above.

The disclosed innovations can thus facilitate the execution and commit of distributed database transactions. The disclosed innovations can result in such distributed transactions being executed and committed more quickly. As another benefit, the disclosed innovations can reduce processor use, as well as the use of network resources, during transaction execution and commit.

Example 2—Distributed Database Environment

This Example 2 describes a distributed database environment in which at least certain disclosed innovations can be implemented. FIG. 1 illustrates a database environment 100 having a plurality of database nodes 110 connected through a network 120. In a particular example, the network 120 is a high-speed/low-latency network. A node, or host, refers to a computing system having a processor and memory. Unless the context clearly indicates otherwise, a node can refer to the host in a single host system (such as a host in a non-distributed system), a host in a system having a master node and a single slave node, or one of a plurality of hosts in a system having a master node and a plurality of slave nodes.

As shown, each node 110 has its own persistency store 130. In some examples, one or more nodes 110 may have shared storage. In a particular example, such as for disaster recovery purposes, a remote instance of the system 100 can be configured to act as a hot standby cluster by continuously replaying logs shipped from the primary cluster 100.

The database nodes 110 are asymmetric, in some respects, since database node 140 has the role of a master or coordinator node and database nodes 150 function as slave or worker nodes. A master node refers to a node (or host) that manages information regarding the master node and one or more slave nodes. A slave node refers to a node that is installed on a different host than the master node and has at least some of its activities or operations controlled or regulated by a master node. In at least some aspects, a database node 110 may be both a master node and a slave node. For example, the node 110 can be designated to act as a master node (where one or more other nodes 110 can act as slave nodes) for some database operations, and as a slave node (where another node 110 acts as the master node, and, optionally, other nodes 110 may act as additional slave nodes) for other database operations.

The master node 140 and the slave nodes 150 are in communication, such as through the network 120, and may send and receive communications to and from one another. As used herein, the term "send" to a destination entity refers to any way of transmitting or otherwise conveying data within a computer system or between two computer systems, whether the data is directly conveyed or through one or more intermediate entities. Similarly, the term "receive," such as to receive from a source entity, refers to the receipt of data within a computer system or between two computer systems, whether the data is received directly from the computer system of original transmission or received through one or more intermediate entities.

Although the master node 140 stores tables and partitions, the master node 140 also can act as a metadata master and a transaction coordinator for transactions in a distributed database system, which can be local transactions at a node (e.g., transactions with database operations occurring only at the master node or a single slave node) or distributed transactions (e.g. transactions with database operations occurring at the master node and at least one slave node, or at multiple slave node). For example, when a client 160 seeks to access metadata at a slave node 150, the slave node retrieves the corresponding metadata from the master node 140 and caches it locally. The cached metadata for a specific database object will be valid until the next DDL (data definition language) transaction is committed for that particular database object. Furthermore, being the transaction coordinator, the master node 140 decides about the commit of multi-node write transactions and can mediate between the slave nodes 150 when they need to exchange transactional information with each other.

The database nodes 110 are symmetric, in other respects, as each node 110 has its own persistency store 130 for the results of persistency operations (e.g., log and checkpoint files). From the perspective of a client 160, in at least some implementations, an application may connect to any of the database nodes 110 and execute arbitrary read and write operations. Tables can be partitioned and distributed across multiple database nodes 110. If a table has partitions defined via hash or range predicates, then those partitions can be distributed and stored in different nodes 110.

Figure 2:
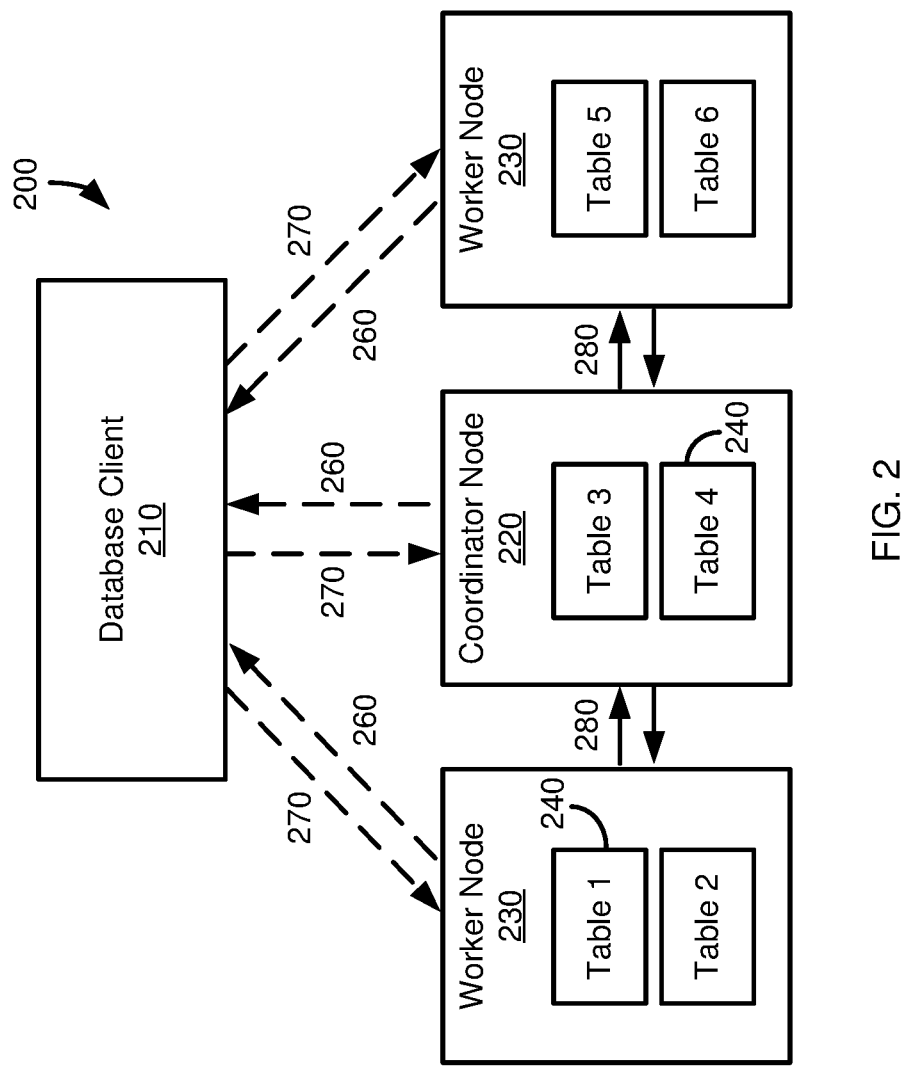
FIG. 2 is a diagram schematically depicting how a database client can communicate with different nodes in a distributed database system, and how such nodes may communicate with each other.

FIG. 2 presents another depiction of a distributed database environment, distributed database environment 200. The distributed database environment 200 includes at least one database client 210 (which can be, for example, one of the database clients 160 of FIG. 1). The database client 210 can communicate with a coordinator (or master) node 220 and one or more worker (or slave) nodes 230. As shown, each of the nodes 220, 230, includes different database tables 240. In some cases, a table 240 shown as a different table may in fact be a common table that is partitioned between two or more of the nodes 220, 230. Also, in some cases, a node 220, 230 can include a table that is a replica of a table maintained on another node (e.g., where one table serves as a source table and another table serves as a replica table, such as when replicating data at multiple nodes is desired for providing high availability of data, such as to guard against failure of a node, or in a scale out environment to improve system responsiveness).

In the distributed database environment 200, the database client 210 may connect with any of the nodes 220, 230 and issue read requests 260 (e.g., queries) and write requests 270 (e.g., DML statements). The nodes 220, 230 can also communicate with each other (e.g. communications 280, which can be forwarded database operations or communications as part of a database operation protocol, such as a transaction execution protocol, a transaction commit protocol, or a garbage-collection protocol for unneeded data). For instance, during transaction commit, the coordinator node 220 can manage the commit of a transaction distributed among worker nodes 230 by sending various communications to, and receiving communications from, any worker nodes involved in the transaction.

In at least some aspects, the database client 210 connects with a node 220, 230, which then executes requests from the database client. In the case of DML statements (and at least certain read requests), if the data needed for a request does not reside on the node 220, 230 to which the database client 210 is connected, the node can forward the request to another node to be executed in whole or part. In other aspects, the database client 210 connects directly with a node 220, 230 that executes an operation requested by the database client.

Each connection between the database client 210 and a node 220, 230 can be associated with one or more identifiers, including an identifier for the connection (which can be for a session where multiple operations, include operations for multiple transactions, can be executed) and/or an identifier for a particular transaction associated with the connection. Thus, different connections between the database client 210 and the nodes 220, 230 are typically associated with different connection and transaction identifiers.

As will be further described, in typical commit protocols, a commit request is sent from the database client 210 to the worker node 220 that is connected to the database client and mediates requests for database operations on behalf of the database client (including sending operations to be executed by other nodes, collecting results, and returning them to the database client), or to which the database client was otherwise connected when the last operation in the transaction was executed. The commit request is usually associated with the transaction identifier associated with the connection between the database client 210 and the node 220, 230 to which it is connected.

Although a client 210 (or 160) may connect to any of the database nodes 220, 230 (or 110), it could be sub-optimal to connect to one of them randomly, or in a round-robin fashion, because, with reference to FIG. 1, the query's required tables or partitions may reside in a node 110 different from its connected execution node 110. If a query's target database objects are located in a different node 110, then the query execution may need to involve node-to-node communication through the network 120, which can be expensive in terms of the delay and resources involved. To minimize this mismatch between the execution location and the data location, a number of strategies can be used in the system 100, for at least certain types of database operations. For other types of database operations, as described above, a database client 160 connects to a node 110, which forwards operations to other nodes as needed, even if additional processing and network communications may result.

Client-side routing is one strategy that can be used to reduce delay and use of other resources. When a given query is compiled (e.g. prepareStatement( ) in the Java Database Connectivity (JDBC) API), its desired locations are cached at the database client library. The next execution of the compiled query (e.g. executePrepared( ) in JDBC) is then, transparently for the application, routed, such as being directly routed, to one of the desired locations. If a query's target table is partitioned and distributed, a single desired location of the query typically cannot be decided at query compilation time, but it can be decided at query execution time by evaluating the given arguments corresponding to the table's partitioning specification.

While client-side statement routing is an approach that changes the execution location to resolve the execution/data location mismatch, it is also possible to change the data location by moving tables or partitions into a different location. The relocation may be triggered by the database administrator or automatically by an advisor tool, such as based on monitoring statistics of a given workload. Alternatively, tables can be co-partitioned in view of particular workload or database schemas in order to avoid expensive multi-node joins.

It is also possible to resolve the execution/data location mismatch by selectively replicating or caching tables/partitions. For example, if a join between two tables reflects a typical query pattern, replicating or caching the less-update-intensive table, or the smaller table, or both, at a node, may improve system performance.

At least certain disclosed distributed database system protocols can provide strong transaction consistency, which can be particularly useful for applications where weakened consistency would not be desirable. In at least some implementations, disclosed transaction protocol can comply with ACID (atomicity, consistency, isolation, durability) properties and provide the same, or at least substantially the same, transactional consistency independently of whether the underlying database is distributed or not.

Regarding the property "isolation" of the four properties in ACID, at least some database environments of the present disclosure can provide one or both of two variants of snapshot isolation, statement-level snapshot isolation (SSI) and transaction-level snapshot isolation (TSI). Snapshot isolation provides non-blocking read access against any concurrent write transactions.

If a transaction consists of one or more statements (such as data manipulation language, or DML, statements), which can be, for example, either of read and write (e.g. INSERT, UPDATE, or DELETE), in SSI, each statement reads data from a snapshot of the committed data at the time the statement started. In TSI, each transaction reads data from a snapshot of the committed data at the time the transaction started. The time associated with a snapshot can be called the snapshot timestamp.

In at least some database environments, SSI and TSI can co-exist, such as being configurable on a per user connection. The definitions of SSI and TSI imply that data once read, in a statement or a transaction respectively, should be visible again within the same statement or transaction even though the data has been changed by a different concurrent transaction. For example, when executing a join query with some predicate, the same record can be visited multiple times within a single statement scope since the intermediate result of a query operator can be passed to the next query operator by a set of references to the filtered records (e.g. row IDs) without necessarily fully materializing them.

Although a Write Skew anomaly can happen under snapshot isolation, where two transactions concurrently read overlapping data, make disjoint updates, and commit, it typically can be avoided in practice by using SELECT FOR UPDATE properly in applications. Contrasted with other concurrency control options, like optimistic concurrency control or two-phase locking, a benefit of snapshot isolation is that read queries can proceed without any query abort or any lock waiting situation, even though they read a database object which is being changed by other transactions.

In some implementations, a disclosed distributed transaction protocol can have additional characteristics. For example, a protocol can provide improved performance for both read-oriented workloads and read/write-mixed workloads. Although optimistic concurrency control can perform acceptably for some read-oriented workloads, it can lead to a high abort ratio for applications which generate concurrent read and write transactions.

Typically, in SSI and TSI, a snapshot timestamp is assigned to a new snapshot when the new snapshot starts. Under SSI, each statement has its own snapshot, while each transaction has its own snapshot under TSI. The cost of the snapshot timestamp assignment operation typically becomes more significant in SSI than in TSI, because the snapshot timestamp is assigned for each transaction under TSI, but for each statement under SSI. SSI thus offers more room for optimizations within the database kernel, because it can be known which tables or partitions need to be accessed in that particular snapshot scope by looking up the statement's query plan before actually executing it.

Another characteristic is that the cost of transaction control operations, such as snapshot timestamp assignment or transaction commit, may become more important for local statements/transactions than multi-node global statements/transactions due to their relative impact on overall performance. When a query touches tables distributed to multiple nodes, the query's execution time involves the network cost of exchanging the intermediate execution result of a node, thus the increase in execution time resulting from the transaction control operations could be relatively trivial. However, if a query does not need to involve any network interaction for its own query processing, then a network roundtrip added only for the transaction control operation, for example, can affect the overall performance significantly. Typically, a large fraction of simple, but highly concurrent, queries (as typically observed in OLTP applications), run as single-node local queries. For example, in a multi-tenant database, tables can be partitioned reasonably well by tenant ID, leading naturally to node-local query execution.

In some aspects of the present disclosure, a database environment includes a table having database records. A new version of a record is created on each update operation instead of overriding the existing record version. Even for record deletion operations, a new version header is typically created with an empty payload instead of deleting the existing record right away. When creating a new record version, a versioning token, such as a version timestamp, representing the version creation time, is stored, such as in a version header. In a particular implementation, the version timestamp is derived from a global synchronization token, such as a transaction commit timestamp, maintained by a central transaction manager (which may be, for example, the coordinator node 140 of FIG. 1) which will be incremented on each commit of a write transaction.

According to a particular example, the versions of a single record are chained to each other in a sorted order, such as by their version timestamps. Older versions in the version chain can be garbage-collected when specified criteria are met, such as when it is determined that there is no potential reader in the system for that record version. In a particular implementation, there being no potential reader in the system can be detected by maintaining a minimum value of snapshot timestamps of active snapshots in the system and comparing it with the version timestamps of the garbage candidates.

When a query tries to read a record version, the visibility of the record is checked by comparing the query's snapshot timestamp with the version timestamp of the candidate record version. If the version timestamp of the record is higher than the snapshot timestamp of the query, the particular record version should typically not be visible to the query because the created version of the record was committed after the query started. Otherwise, if the version timestamp of the record is not higher than the snapshot timestamp of the query, the record version should typically be visible to the query.

One potential issue in snapshot isolation implementation is updating version timestamps of multiple different rows in a transaction with the transaction's assigned commit timestamp in an atomic way. At version creation time, the embracing version timestamp can typically be correctly and finally set only after the embracing write transaction receives its commit timestamp within the commit procedure. However, if the versions of the write transactions are updated with their commit timestamp one by one, then some of those versions could be visible to another snapshot while the others might still be invisible. Such an outcome would not fully comply with the atomicity rule in the ACID properties.

To avoid this potential anomaly concerning visibility atomicity, a transaction context can be maintained for each write transaction. When a write transaction starts its first write operation, a transaction context entry is created. In a particular example, all created row versions store a pointer to the transaction context entry in their version header field. At commit time, the transaction context entry is updated with the write transaction's commit timestamp, and thus is available to the other versions through the pointer to the transaction context entry. After the transaction commit processing is completed, the commit timestamp written in the transaction context entry is asynchronously propagated to the version timestamp fields. The transaction context entry may then be garbage-collected. With this atomic indirect commit timestamp assignment to the created versions, visibility atomicity is still facilitated under this snapshot isolation implementation.

Figure 3:
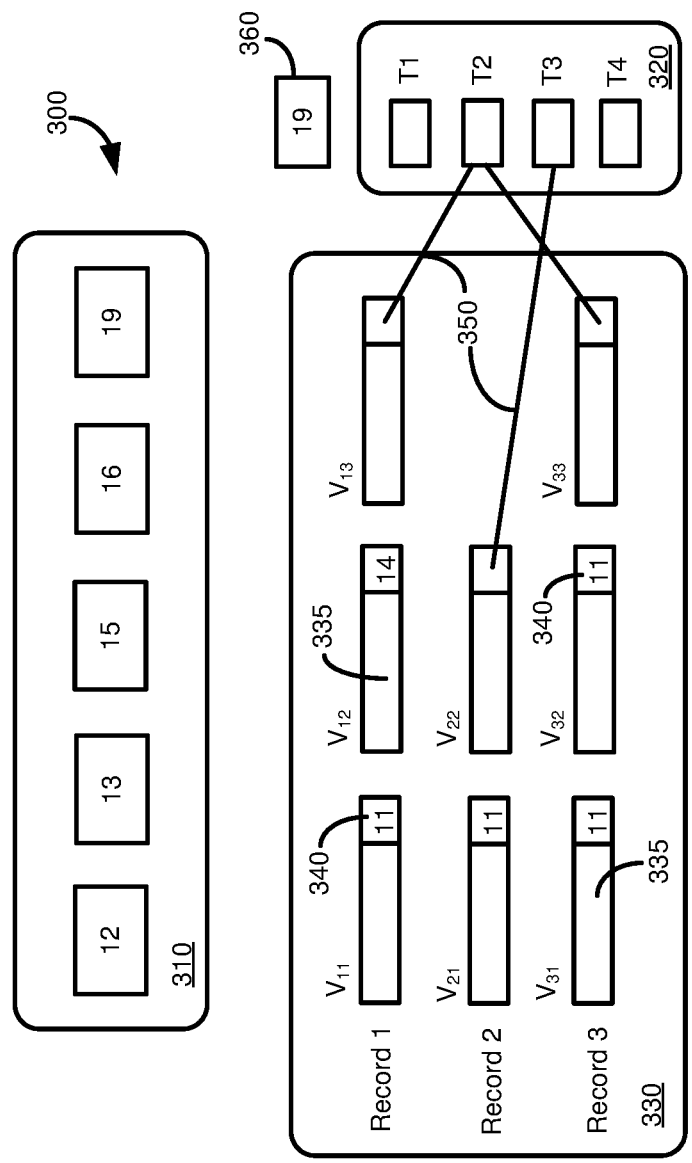
FIG. 3 is a diagram depicting an architecture of a transaction context providing version space management that may be used in at least certain implementations of the present disclosure.

FIG. 3 depicts an architecture 300 illustrating a transaction context providing version space management. The architecture 300 includes a snapshot timestamp store 310 that stores five active timestamps 12, 13, 15, 16, and 19. Architecture 300 further includes a transaction context store 320 for four active write transactions, T1, T2, T3, T4, each with their own transaction context entry. A record chain store 330 holds three database records, Record 1, Record 2, and Record 3, each with its own version chain of record versions 335. Each record version 335 includes a version timestamp 340.

As shown, from the viewpoint of a snapshot whose snapshot timestamp is 12, $V_{11}$ and $V_{21}$ are visible (because their version timestamps are less than the snapshot timestamp) but the other record versions 335 are not. $V_{13}$, $V_{22}$, and $V_{33}$ do not have their version timestamps yet, because their write transactions are not yet committed. Under this transaction state, the record versions 335 store a pointer 350 to the corresponding transaction context entries ($T_2$ and $T_3$). Once $T_2$, for example, commits, then the transaction commit timestamp (19, as shown) of the transaction manager 360 at that time is copied to the transaction context entry 320, thus providing visibility atomicity indirectly. Note that the data structures in FIG. 3 are provided to give a conceptual overview, but their actual implementation can be different. For example, depending on whether the corresponding table is a row store or a column store, both of which may be supported in a single database system, the storage layout of the record versions may be different.

Although read statements do not acquire locks in at least certain implementations of the present disclosure, a write transaction typically acquires an exclusive lock of its updated record to ensure a serializable schedule of concurrent write operations. If the latest version of the record is not visible to the snapshot after the exclusive record lock is acquired, then a transaction under TSI may throw an error to the end user. A statement under SSI, however, may be configured to restart the statement by substituting its statement timestamp with a newer value of the transaction commit timestamp. In at least certain examples, database objects are finally updated after lock acquisition and validation. In further examples, lock tables are partitioned according to the location of their corresponding tables, or partitioned together with a multi-node deadlock detection implementation, to detect when dependencies between write operations carried out at different nodes prevent transaction commitment.

Example 3—Distributed Snapshot Isolation

This Example 3 describes situations that can arise in distributed transaction processing, and also describes aspects of the present disclosure that may be used in addressing such situations. Table 1 provides a set of symbols that may be used to describe a distributed transaction protocol.

TABLE 1

Notations

| Symbol | Description |
| --- | --- |
| CTS | Transaction commit timestamp of a transaction manager, incremented when a write transaction commits |
| GCT | CTS at the coordinator node |
| $LCT_i$ | CTS at a worker node i |
| $CID(T_i)$ | Commit ID of a write transaction $T_i$, assigned from GCT or LCT when $T_i$ commits |
| $pCID(T_i)$ | Precommit ID of a write transaction $T_i$, assigned from GCT or LCT when $T_i$ precommits |
| $Status(T_i)$ | Status of a write transaction $T_i$, either of {Unused, Active, Precommitted, Committed, Aborted} |
| $TID(T_i)$ | Transaction identifier of a transaction $T_i$ |
| $STS(Si)$ | Snapshot timestamp of a snapshot $S_i$, assigned from GCT or LCT when the snapshot (statement or transaction) starts |

In at least certain implementations, a disclosed distributed transaction protocol can provide the same level of transactional consistency regardless of how many nodes the database is partitioned into. For example, a database environment may evolve from a single-node system to a multi-node distributed system, such as to handle higher workloads or larger database volumes. It may be undesirable for users to change their own application logic and adapt it for a potentially weaker consistency level provided by the database engine. This Example 3 describes two consistency properties of distributed database environments that can be addressed by at least certain distributed transaction protocols of the present disclosure.

According to the principle of visibility atomicity, a transaction's changes should be visible to another concurrent snapshot in an atomic way: either completely visible or not. Achieving visibility atomicity under snapshot isolation in a distributed database environment can be difficult because the record versions created by a write transaction can be distributed across worker nodes. For example, for a multi-node write transaction, if each updated node is committed one by one, then the changes of a node can be visible earlier to another concurrent reader, but others may not be visible to the same reader.

Figure 4:
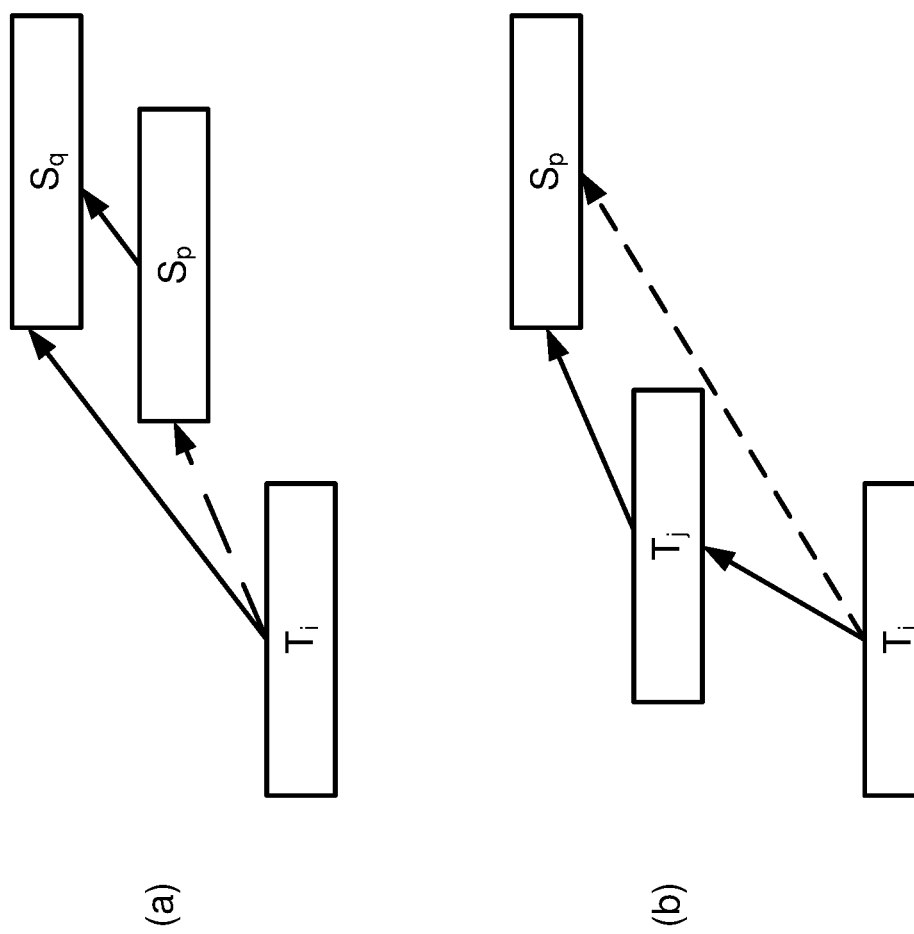
FIG. 4 is a diagram illustrating properties of snapshot monotonicity that may be provided by at least certain implementations of a disclosed distributed transaction protocol with reference to an arbitrary pair of snapshots and an arbitrary pair of write transactions.

According to the principle of snapshot monotonicity, a transaction protocol is said to ensure snapshot monotonicity if all of the following conditions (visually represented in FIG. 4) are met for an arbitrary pair of write transactions, $T_i$ and $T_j$, and an arbitrary pair of snapshots, $S_p$ and $S_q$:

If $T_i$'s changes were visible to $S_q$, and $S_q$ was started after $S_p$'s start, then $T_i$'s changes should be visible to $S_p$ as well (FIG. 4(a)).

If $T_i$'s changes were visible to $S_p$, and $T_j$ committed after $T_i$'s commit, then $T_i$'s changes should be visible to $S_p$ as well (FIG. 4(b)).

Snapshot monotonicity is not represented by traditional ACID property definitions. However, it is a feature that may be appreciated by users. For example, assume a SalesOrder processing component in a business application inserted a record into a database table Tab1 by using a transaction $T_1$, and then it notified the event to a SupplyAvailabilityCheck processing component via a messaging protocol inside an application server after $T_1$ is committed. The SupplyAvailabilityCheck processing component then inserts a new record into a table Tab2 by using another transaction $T_2$. Then, it will be expected that the inserted record by SalesOrder processing (into Tab1 by $T_1$) should be visible to an analytic query which joins the tables Tab1 and Tab2 if the inserted record by SupplyAvailabilityCheck processing (into Tab2 by $T_2$) was visible to the join query.

For visibility atomicity of multi-node transactions, certain aspects of the present disclosure provide a delayed visibility decision scheme that employs an in-doubt visibility state of record versions and metadata entity versions. The visibility in-doubt state means that the write operation of the target record versions started its commit processing but is not yet finished. Under this state, the visibility to a given snapshot is not immediately decided, but postponed until the transaction state is marked as committed. The in-doubt state results in the sub-operations being effectively atomic without relying on any latch or lock.

Example 4—Snapshot Management

Algorithm 1 shows how a statement checks if a record version V should be visible or not to a snapshot S (a statement under SSI or a transaction under TSI). For the visibility decision, first, V's creator transaction's state is checked. If it is aborted or active, then V should not be visible to S (lines 8 to 11). If it is committed, then V's CID is compared to STS(S). V is visible to S only if STS(S) is equal to or larger than V's CID (lines 3-7).

---

Algorithm 1 Visibility decision algorithm: check if a record
version V should be visible to a snapshot S or not 1: while TRUE do
2:    if V's status is Committed then
3:       if V's CID ≤ STS(S) then

| Algorithm 1 Visibility decision algorithm: check if a record version V should be visible to a snapshot S or not |
| --- |
| 4:  return TRUE |
| 5:  else |
| 6:  return FALSE |
| 7:  end if |
| 8:  else if V's status is Aborted then |
| 9:  return FALSE |
| 10:  else if V's status is Active then |
| 11:  return FALSE |
| 12:  else if V's status is Precommitted then |
| 13:  if V's pCID ≥ STS(S) then |
| 14:  return FALSE |
| 15:  else |
| 16:  wait until V's status becomes Committed or Aborted |
| 17:  end if |
| 18:  end if |
| 19: end while |

In addition to the basic visibility rules, the following extensions are provided. As previously mentioned, and as recited in Algorithm 1, at least certain implementations provide a statement or transaction status of being precommitted, where the final commitment of the statement or transaction is treated as in-doubt, with the visibility decision being delayed until the in-doubt status has been resolved, such as by the statement or transaction being committed. If V's status is precommitted (lines 12 to 17), the corresponding record version's visibility decision is postponed. The precommitted/in-doubt state makes sub-operations of a transaction commit effectively atomic without relying on any latch or lock.

The delayed visibility decision scheme may result in a situation where a read statement may need to wait for another write transaction's commit to be completed. However, this waiting situation is typically uncommon, because it happens when a read statement is trying to check the visibility of a record version which was created by a write transaction committed at the same time as the read attempt. To further reduce the possibility of a reader waiting for an in-doubt transaction to complete, particular implementations of a disclosed transaction management protocol can include early pruning of record versions that will never be visible.

As explained above, the in-doubt period of a transaction is started by setting the transaction's state as precommitted. By assigning pCID, which is typically defined to be smaller than its CID value to be decided later, at the time when the transaction state is set as precommitted, record versions which will never be visible to the pending reader statement, such as because the query was started later than the write operations and thus should only view records that were available when the query was started, can be pruned. More specifically, if STS(S) is smaller than or equal to pCID(T) for a write transaction T and a snapshot S, then STS(S) will also be smaller than CID(T) because pCID(T) is smaller than CID(T) assigned by the commit protocol. Thus, if STS(S)≤pCID(T), it can be determined that the tested version V is not visible to S (lines 13 to 14 of Algorithm 1) without waiting any further.

In at least certain implementations of the present disclosure, garbage collection is executed independently in each worker node, but it considers not only the queries running in its local node, but also multi-node queries which were started at different worker nodes but can potentially access the local node. In order to reflect such global queries during local garbage collection, the coordinator node can maintain all the active global queries by watching the incoming StartGlobalSnapshot calls and EndGlobalSnapshot calls. When local garbage collection starts at a worker node, it gets the minimum STS value of active global queries, called MinActiveGlobalSTS, from the coordinator node, and also the minimum STS value of its active local queries, called minActiveLocalSTS, from its local node. Taking the minimum value of MinActiveGlobalSTS and MinActiveLocalSTS, the garbage collector finds out the record versions that have version timestamps which are smaller than the minimum value by traversing the record version chains.

Figure 5:
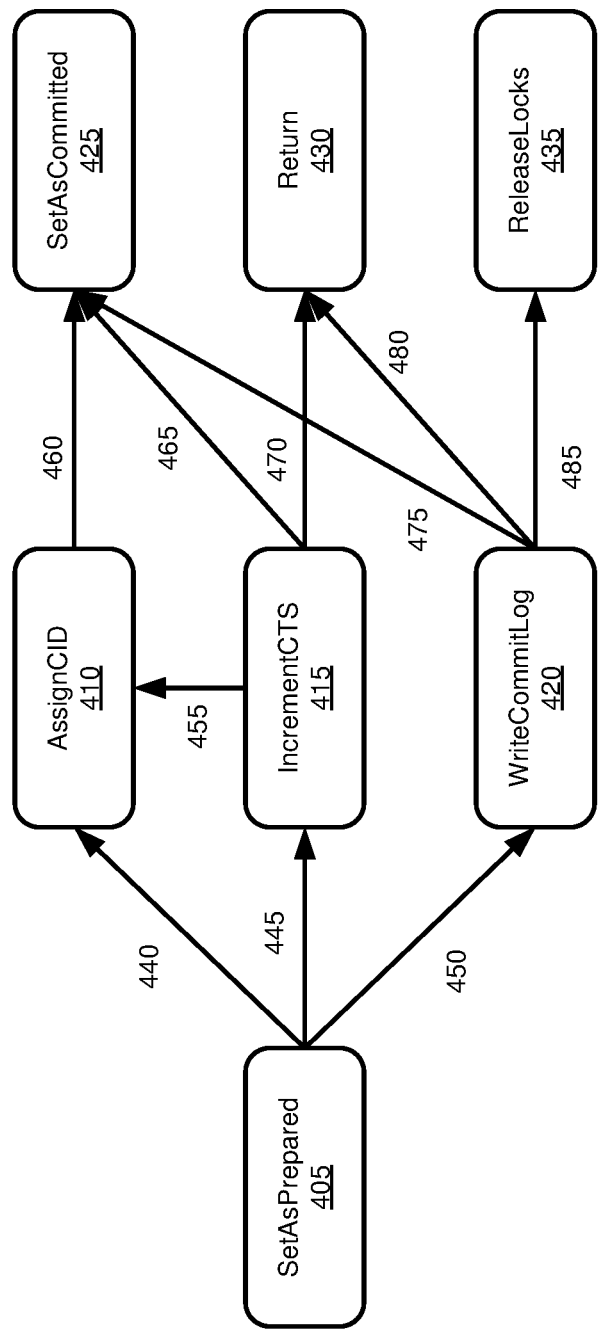
FIG. 5 is a diagram illustrating an operation ordering that may be used with at least certain disclosed innovations.

Example 5—Example Commit Protocol with Commit Request Sent from Database Client to Worker Node This Example 6 describes a transaction commit protocol according to an embodiment of the present disclosure, which may have different implementations depending on the write transaction type. Commit protocols according to the embodiment of the present disclosure have a common set of sub-operations (Table 2) and employ the same ordering rules among those sub-operations (FIG. 5).

TABLE 2

Sub-operations of transaction commit

| ID | Description |
| --- | --- |
| SetAsPrepared | Set the transaction's status as precommitted |
| IncrementCTS | Increment GCT or LCT depending on where it commits |
| AssignCID | Assign the transaction its CID value and associate it with the transaction's created record versions |
| WriteCommitLog | Write the transaction's commit log to persistent storage |
| SetAsCommitted | Set the transaction's status as committed |
| ReleaseLocks | Release all the write locks acquired by the transaction |
| Return | Acknowledge the completion of the transaction's commit to the client which requested it |

A write transaction's status becomes precommitted by SetAsPrepared until SetAsCommitted is called later for the transaction. As previously mentioned, this in-doubt state can be used by the delayed visibility decision scheme to help ensure the atomicity of IncrementCTS and AssignCID of a write transaction without relying on any latching or locking during transaction commit processing. When IncrementCTS is called, GCT or LCT is incremented depending on which type of node it commits. Based on the new GCT or LCT value, the transaction's CID is decided at AssignCID.

When WriteCommitLog is called, the write transaction generates a commit log entry and writes it to persistent storage, then calls SetAsCommitted that sets the transaction's status as committed, and then calls ReleaseLocks, which releases all the write locks acquired by the transaction. If SetAsCommitted is finished, the write transaction's created record versions can be potentially visible to other readers. If ReleaseLocks is finished, then the write transaction's changed records can be potentially changed again by other writers. Note that, following the multi-version concurrency control approach, a write operation of a transaction acquires a write lock on the changed record, but read operations do not acquire any lock. Finally, at Return, the transaction's commit is acknowledged to the client which requested it.

Among those suboperations, a predefined execution order is typically maintained to help ensure transactional consistency, which is shown in FIG. 5. For operation boxes 405, 410, 415, 420, 425, 430, 435, arrows 440, 445, 450, 455, 460, 465, 470, 475, 480, 485 indicate that the operation at the tail end of the arrow should be executed before the operation at the head of the arrow.

The execution order 475, between WriteCommitLog 420 and SetAsCommitted 425, and the execution order 480 between WriteCommitLog 420 and Return 430, should typically be maintained in order to help provide snapshot monotonicity. Otherwise, snapshot monotonicity may not occur, because once visible data might not be visible any more after crash restart. Execution order 485, between WriteCommitLog 420 and ReleaseLocks 435, should also typically be maintained, as it provides two-phase locking. Otherwise, uncommitted data can be changed again by another transaction, potentially leading to a cascaded rollback problem.

Without maintaining execution order 460, between AssignCID 410 and SetAsCommitted 425, a record version that should be visible to a query may not be visible because the CID assignment to the record version is not yet finished. Without execution order 465, between IncrementCTS 415 and SetAsCommited 425, and execution order 470, between IncrementCTS 415 and Return 430, commit-marked or commit-informed data might not be visible even to its next query of the same session because the next query may start with a smaller snapshot timestamp value than the previously committed transaction's CID value.

Execution order 455, between IncrementCTS 415 and AssignCID 410, also helps provide snapshot isolation. For example, if IncrementCTS 415 is performed after AssignCID 410, a query that started before a write transaction T1's IncrementCTS 415 operation could see T1's changes later because the STS value assigned to the query could be identical to T1's CID value. SetAsPrepared 405 should typically be executed before WriteCommitLog 420 (transaction order 450) as well as before IncrementCTS 415 and AssignCID 410 (execution orders 445 and 440, respectively), since these two suboperations should be made effective for other transactions in an atomic way. For example, if IncrementCTS 415 is completed, but AssignCID 410 is not yet finished for a write transaction T1, then a different reader statement S1 can have STS(S1)>=CID(T1). However, since T1 does not yet have any CID, S1 can interpret T1's created versions as invisible but suddenly they will become visible when T1 finishes AssignCID, which will violate snapshot isolation.

Figure 6:
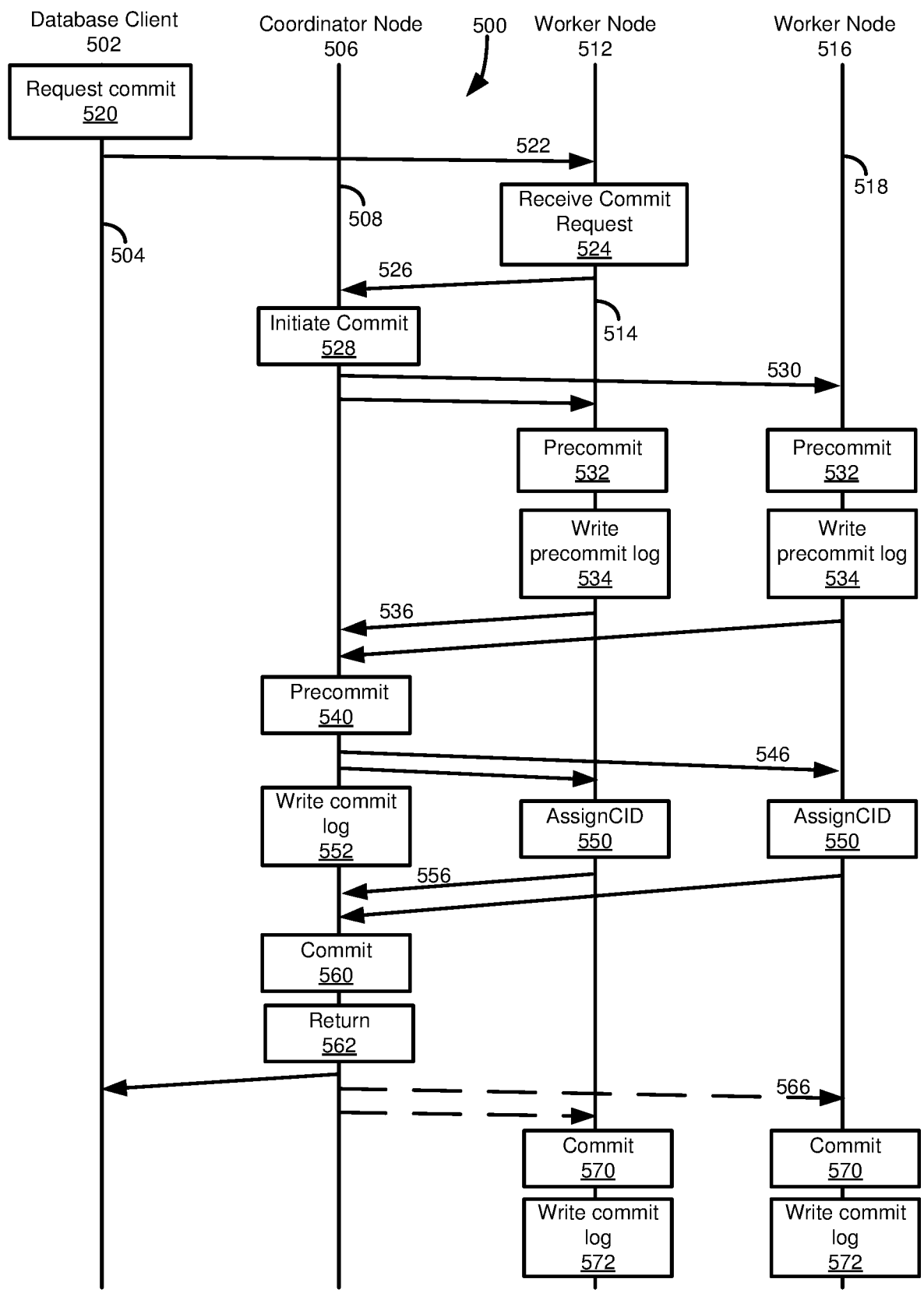
FIG. 6 is a diagram depicting operations occurring at a database client, a coordinator node, and a plurality of worker nodes in a typical commit protocol for a distributed database system.

FIG. 6 presents a system 500 having a database client 502, a coordinator node 506 and worker nodes 512, 516, with respective execution timelines 504, 508, 514, 518. The system 500 illustrates how a transaction having one or more write operations, such as a plurality of write operations, commits. For instance, the transaction may have updated tables located in more than a single worker node 512, 516. To help provide durable atomicity of changes in multiple nodes 506, 512, 516, the system 500 employs a two-phase commit approach. The commit log of the coordinator node 506 is written only after the precommit log entries of the transaction are safely written to persistent storage at all of the worker nodes 512, 516 changed by the transaction.

In some implementations, the database client 502 connects with the worker node 512 to execute a plurality of database operations. For instance, the database client 502 can send a request to read or write data to the worker node 512. If the worker node 512 hosts the relevant data, the worker node can execute the request. If the worker node 512 does not host the relevant data, the worker node can forward the request to another node (e.g. the coordinator node 506, the worker node 516, or another node). When the worker node 512 does not directly execute a request, it can receive execution results from a node which executed the request, and can send the execution results to the database client 502.

A least one database operation was executed on the worker node 512, and at least one database operation was executed on the worker node 516. In other implementations, a transaction can include one or more operations and can be distributed among the coordinator node 506 and one or more worker nodes (including the worker node 512, the worker node 516, both worker nodes, or both worker nodes and one or more additional worker nodes) in a different manner. At least one operation in a transaction to be committed is carried out at a node 506, 512, 516 other than the worker node 512, 516 to which the database client 502 is connected.

The commit protocol begins at 520, where the database client 502 sends a request to commit a transaction to the worker node 512 in a communication 522. The worker node 512 receives the request at 524 and sends the commit request to the coordinator node 506 in communication 526. The coordinator node 506 initiates the commit process at 528, and sends communications 530 to the worker nodes 512, 516 to prepare the worker nodes for the transaction commit. The communications 530, in a particular example, include a transaction identifier (TransactionID) for the transaction to be committed. The transaction identifier can be, in some cases, a transaction identifier associated with a connection between the worker node 512 and the database client 502, and can be provided in communication 526.

In precommit blocks 532, each worker node 512, 516 executes SetAsPrepared to precommit the transaction, assigning the transaction the LCT currently maintained at the worker node. The worker nodes 512, 516 then write the transaction to persistent storage, such as in a precommit log, in block 534, flushing the pending redo logs of the transaction. The worker nodes 512, 516 then communicate with the coordinator node 502, via notifications 536, indicating that the transaction has been precommitted at the worker nodes and confirming to the coordinator about the commit readiness of the worker nodes.

When the coordinator node 506 receives the notifications 536, at 540, the coordinator node precommits the transaction, assigning the transaction a pCID equal to the current GCT maintained by the coordinator node. The coordinator node 506 also increments the CTS (which is also the GCT, in this case) using IncrementCTS, and assigns the incremented CTS to the transaction as the CID (using AssignCID). Once the coordinator node 506 has precommitted the transaction, including assigning the CID, the coordinator node sends communications 546 to the worker nodes 512, 516 indicating the precommitment and associated CID. The worker nodes 512, 516 then increment their locally maintained LCT values (such as using IncrementCTS) at 550. In a particular example, the worker nodes 512, 516 select as the new LCT value the larger of the current LCT value maintained at the worker node and the CID for the transaction received from the coordinator node 506 in communication 546. The worker nodes 512, 516 then assign the new LCT value as the CID for the transaction.

Each worker node 512, 516, after completing block 550, sends a communication 556 to the coordinator node 506, indicating that the transaction was successfully assigned a new CID at the worker node. While the communications 546, and the increment and assign functions at 550, are being carried out, the coordinator node 506 writes the commit to persistent storage at 552 (using WriteCommitLog, for example), such as to a commit log.

When the persistency operation 552 has completed, and the coordinator node 506 has received the communications 556 from each of the worker nodes 512, 516, the coordinator node marks the transaction as committed and releases the locks on any records or tables, such as using SetAsCommitted and ReleaseLocks, at 560. The completion of the transaction is acknowledged by the coordinator node 506 to the database client 502 at 562 (such as using the Return operation). In a least some cases, the commit acknowledgement is instead sent to the database client 502 by the worker node 512, such in response to a communication to the worker node by the coordinator node 506.

The coordinator node 506 sends communications 566 to the worker nodes 512, 516, such as asynchronously, that the transaction has been committed by the coordinator node. When the worker nodes 512, 516 receive the communication 566, the worker nodes commit the transaction and release their record or table locks at 570. The transaction commit is then written by the worker nodes 512, 516 to persistent storage, such as a commit log, at 572.

The process used in system 500 involves several communications between the coordinator node 506 and the worker nodes 512, 516. To reduce potential performance impacts from these communications, such as network round trips, during commit processing, the second round trip (communications 546 and 556) is overlapped by the log persistency I/O (552) and the third trip (which does not need to be a round trip, in at least some examples) is carried out asynchronously after the transaction's commit is acknowledged to the client at 562. In terms of transaction latency, only the first round trip, used to help provide durable atomicity for multi-node write operations, presents an added latency cost. In terms of transaction processing throughput, the network cost is reduced, in some examples, by grouping and coalescing the network I/O requests made by concurrent transactions.

By acknowledging the commit earlier in the commit process, without waiting for the final commitment of the transaction by the worker nodes 512, 516 at 570, 572, the next operation of the same session might encounter a tentative lock conflict if the next operation tries to update the same record or metadata entity updated by the previous transaction. In at least some implementations, the tentative conflict should not produce any unexpected behavior for end users, because the lock wait time period will typically be short compared with common lock timeout values. Following the ordering 400 of FIG. 5, in at least some implementations, the second round trip (546, 556), is not skipped or coalesced with the third communication (566), because the IncrementCTS operation should be carried out before the Return operation.

The multi-node transaction commit process described in FIG. 5 also takes advantage of the delayed visibility decision scheme during the in-doubt period for visibility atomicity across changes distributed to multiple nodes. The coordinator node 506 additionally has an in-doubt period so that it can decide the transaction's CID value earlier and the network I/O for CID propagation (communication 546) can be overlapped by the log persistency I/O (552) for WriteCommitLog at the coordinator node 506.

The WriteCommitLog operations 572 at the worker nodes 512, 516 can be initiated after the Return operation 562 at the coordinator node 506. Even if a worker node 512, 516 crashes without having written its local commit log, the transaction can be detected as an in-doubt transaction during its restart and thus it can be committed again by referring to the coordinator node 506. If there is neither a precommit nor a commit log entry at a worker node 512, 516, then the transaction can be rolled back at the worker node without asking the coordinator node 506.

Note that, in FIG. 5, as long as pCID(T) is smaller than CID(T) for a transaction T, the pCID values of a transaction at different nodes do not need to have the same value, while CID values should be identical, because the pCID values are used as a hint for early filtering of false positive cases.

Example 6—Example Commit Request Sent from Database Client to Coordinator Node

As described above, including in Example 5, unless the database client connected with the coordinator node to carry out a transaction, initiating a transaction commit involves first sending the commit request to a worker node (to which the database client was connected to execute the transaction), and then the worker node sending the commit request to the coordinator node. Thus, using a worker node to execute a transaction involves at least one network communication that would not be needed if the database client executed the transaction through the coordinator node. This Example 6 describes a disclosed innovation that can eliminate the sending of the commit request from the worker node to the coordinator node by instead having the database client use a connection between the database client and the coordinator node to initiate the commit process.

Figure 7:
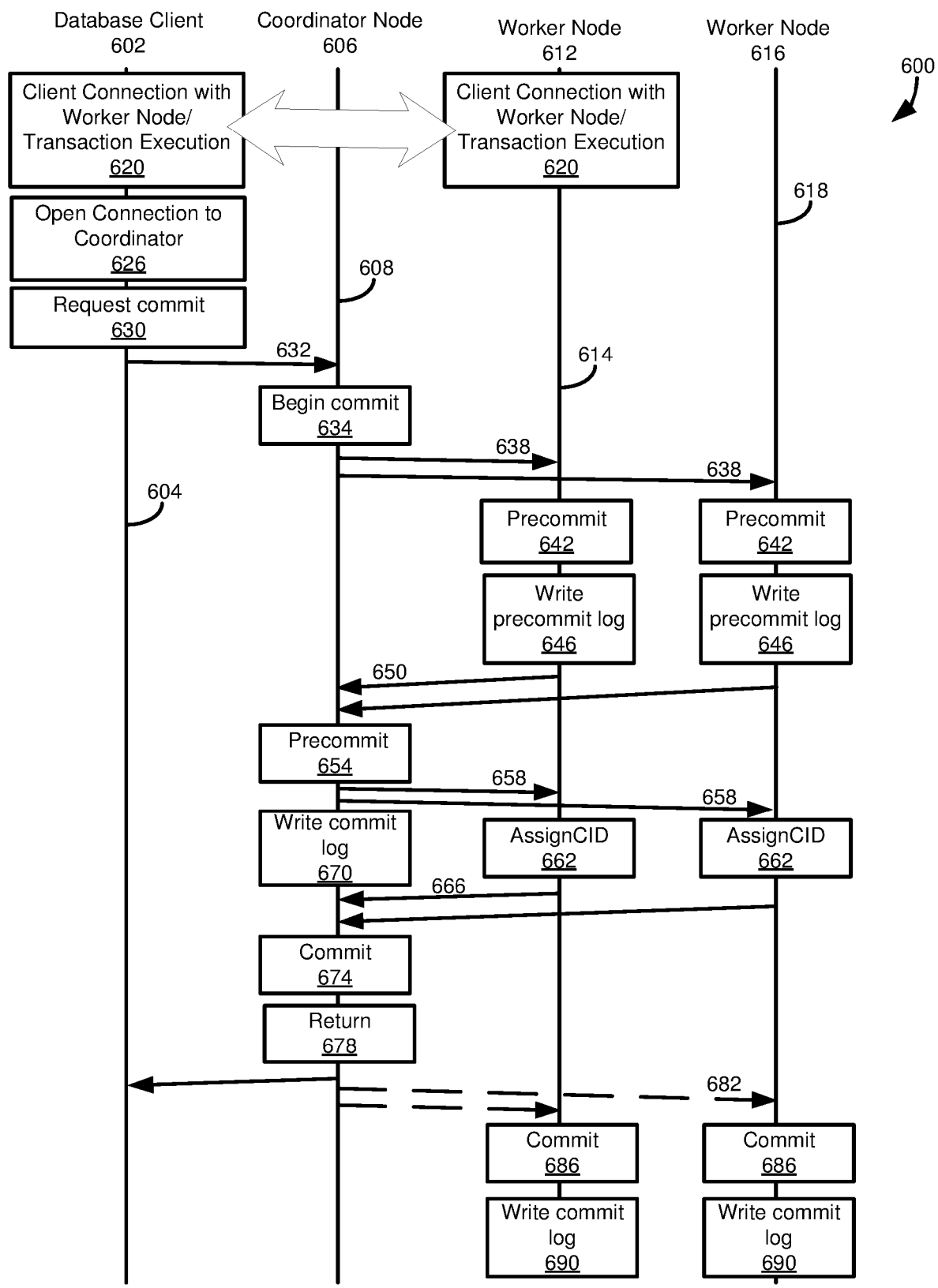
FIG. 7 is a diagram depicting operations occurring at a database client, a coordinator node, and a plurality of worker nodes in a distributed database system commit protocol of a disclosed innovation, where a commit request is sent directly from the database client to the coordinator node.

FIG. 7 illustrates operations 600 occurring at a database client 602, a coordinator node 606, a worker node 612, and a worker node 616, having respective execution timelines 604, 608, 614, 618. At 620, the database client 602 and the first worker node 612 execute one or more operations, such as a plurality of operations, in a transaction. Typically, one or more of the operations are carried out by the worker node 616.

In carrying out the operations, the worker node 612 receives a request from the database client 602. If the worker node 612 hosts the relevant data, the worker node executes the operation and returns execution results to the database client 602. If the worker node 612 does not host all of the relevant data, the worker node forwards at least a portion of the operation to the worker node 616 to be executed, receives execution results from the worker node 616, and returns the execution results to the database client 602. In carrying out these operations, a connection is established between the database client 602 and the worker node 612. The connection can be associated with an identifier, and the connection can be associated with a transaction, which can also have an identifier.

At 626, the database client 602 opens a connection (e.g., a network connection) with the coordinator node 606. In some cases, the database client 602 may already have a connection with the coordinator node 606 that can be used. In other cases, a new connection is established between the database client 602 and the coordinator node 606. The connection between the database client 602 and the coordinator node 606 is associated with a connection identifier, which is different than the connection identifier for the connection between the database client and the worker node 612. The connection between the database client 602 and the coordinator node 606 can also be associated with a transaction identifier, which is typically different than the transaction identifier associated with the connection between the database client and the worker node 612.

However, in some aspects, the connection between the database client 602 and the coordinator node 606 can be instantiated with the transaction identifier of the connection between the database client 602 and the worker node 612, or can be updated to have such transaction identifier. For instance, a software interface may be provided that includes a method for creating a new connection, where a transaction identifier can be provided as an argument, or a default value (such as a newly assigned or created value) can be used. Similarly, a software interface may be provided that includes a method for changing a transaction identifier for an already-established connection between a database client and a database node.

The database client 602 generates a commit request at 630. The commit request includes the transaction identifier associated with the connection between the database client 602 and the worker node 612, which is the transaction to be committed. The commit request is sent in communication 632 to the coordinator node 606 by the database client 602 using the connection established between the coordinator node and the database client. The coordinator node 606 then begins the commit process at 634. The remaining operations can be otherwise analogous to the corresponding operations described in Example 5 with respect to FIG. 6.

Briefly, the coordinator node 606 sends communications 638 to the worker nodes 612, 616, instructing them to mark the transaction as precommitted at 642 and to write a prepare commit log entry for the transaction at 646. The worker nodes 612, 616 send acknowledgment communications 650 to the coordinator node 606. When the coordinator node 606 receives the communications 650, it marks the transaction as precommitted at 654.

The coordinator node 606 sends communications 658 to the worker nodes 612, 616, indicating that the transaction was marked as precommitted at the coordinator node and informing the worker nodes of the assigned commit ID value. The worker nodes 612, 616 associate the commit ID with the transaction at 662 and send acknowledgment communications 666 to the coordinator node 606. After sending the communications 658, the coordinator node 606 writes a commit log entry for the transaction at 670. At 674, the coordinator node 606 marks the transaction as committed and returns a commit acknowledgment to the database client 602 at 678 (such as over the connection established at 626). The coordinator node 606 also sends, such as asynchronously, communications 682 to the worker nodes 612, 616 indicating that the transaction was committed at the coordinator node and that the worker nodes should mark the transaction as committed as 686 and write a commit log entry for the transaction at 690.

Thus, the operations 600 can provide for the more efficient and faster processing of commit operations. In particular, the operations 600 remove a communication between the worker node 612 and the coordinator node 606 (e.g., the communication 526).

Example 7—Example Tracking of Nodes Involved in a Database Transaction

The modified transaction commit protocol described in Example 6, and depicted in FIG. 7, can improve the efficiency of commit processing by eliminating a network communication between the coordinator node and the worker node that was connected to the database client in executing the transaction. Disclosed innovations can provide improvements in other areas of database transaction processing, such as communicating which nodes are involved in the commit of a multi-node transaction.

Figure 8:
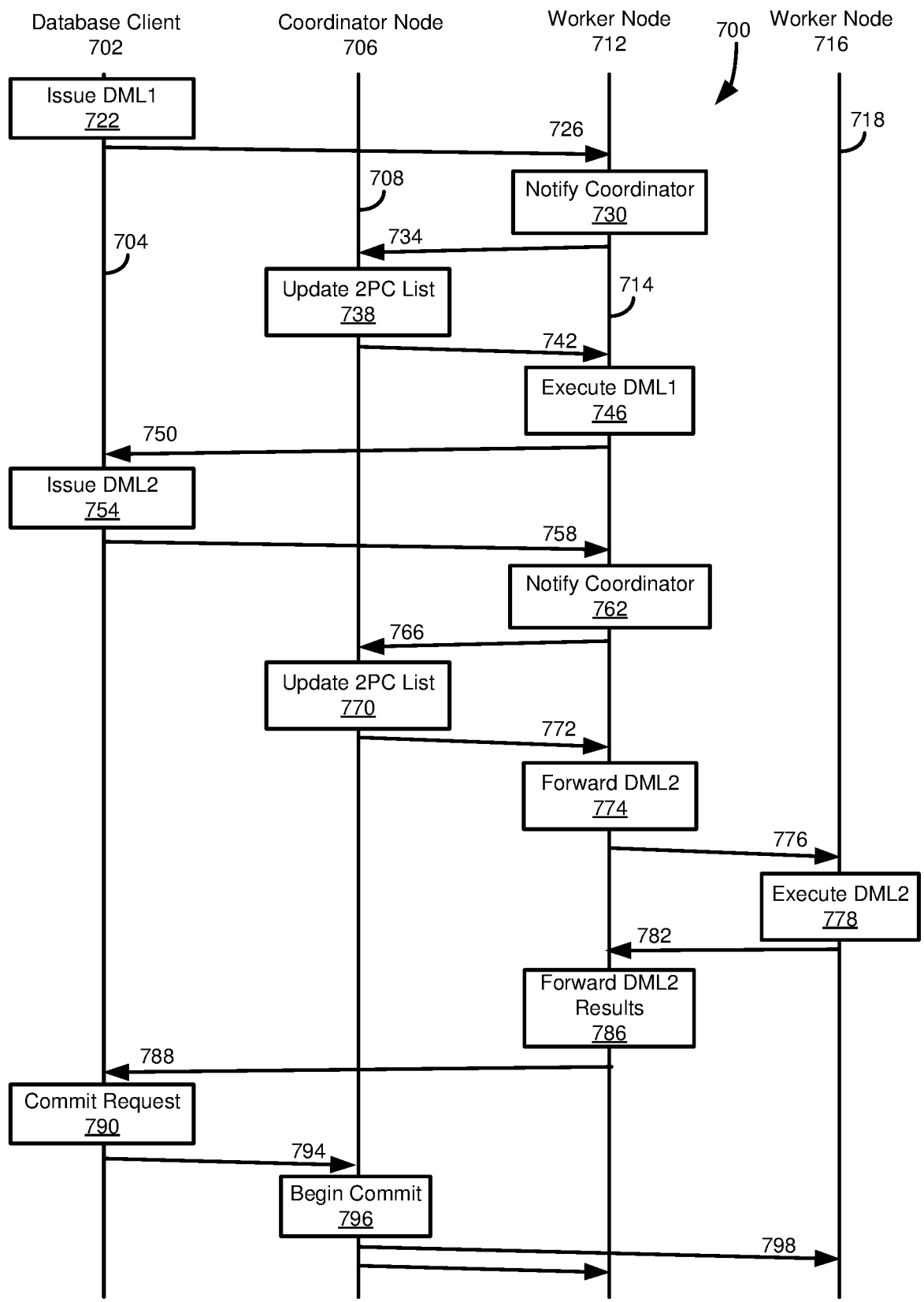
FIG. 8 is a diagram depicting operations occurring at a database client, a coordinator node, and a plurality of worker nodes during a typical transaction execution protocol for a distributed database system.

FIG. 8 illustrates operations 700 occurring at a database client 702, a coordinator node 706, a worker node 712, and a worker node 716, having respective execution timelines 704, 708, 714, 718, during transaction execution according to a typical transaction processing protocol. At 722, the database client 702 issues a first DML request for the transaction. A connection, having an identifier, is established between the database client 702 and the worker node 712. The connection can also be associated with a transaction identifier for the transaction being executed.

In this case, DML1 is to be executed at the worker node 712. DML1 is sent from the database client 702 to the worker node 712 in communication 726. At 730, after receiving DML1, the worker node 712 sends a communication 734 to the coordinator node 706 indicating that the worker node 712 is involved in the transaction and should be added to a list of nodes to be included in the commit of the transaction. The coordinator node 706 updates a list of nodes to be involved in the commit process (e.g., in a two-phase commit process) at 738. After updating the list, the coordinator node 706 sends an acknowledgement to the worker node 712 in communication 742. The worker node 712 executes DML1 at 746 and sends an acknowledgment (such as indicating that the DML statement was successfully executed) to the database client 702 in communication 750.

At 754, the database client generates a second DML statement, DML2. DML2 is executable at the worker node 716. DML2 is sent to the worker node 712 in communication 758. At 762, the worker node 712 sends a communication 766 to the coordinator node 706 indicating that worker node 716 is involved in the transaction and should be added to the list of nodes to be included in the commit of the transaction. The coordinator node 706, at 770, updates the list of nodes to be involved in the commit process. After updating the list, the coordinator node 706 sends an acknowledgment to the worker node 712 in communication 772.

At 774, the worker node 712 forwards DML2 to worker node 716 for execution in communication 776. The worker node 716 executes DML2 at 778 and sends execution results to the worker node 712 in communication 782. At 786, the worker node 712 receives the communication 782 and forwards execution results to the database client 702 in communication 788.

The database client 702 requests the commit of the transaction with DML1 and DML2 at 790. The database client 702 sends the commit request to the coordinator node 706 in communication 794. The coordinator node 706 begins the commit process at 796 by sending precommit requests 798 to the worker nodes 712, 716, as they are both involved in the commit process (e.g., they both carried out DML statements in the transaction being committed). The remainder of the commit process can be carried out as described with respect to FIG. 6.

The disclosed innovations embrace various changes that can be made to the operations 700. For instance, rather than sending all DML statements to the worker node 712, the database client 702 can be connected to the worker node 716 can send DML statements, such as DML2, directly to the worker node 716 for execution. In this case, the worker node 716 can inform the coordinator node 706 that the worker node 716 is involved with the transaction and can return execution results directly to the database client 702.

Figure 9:
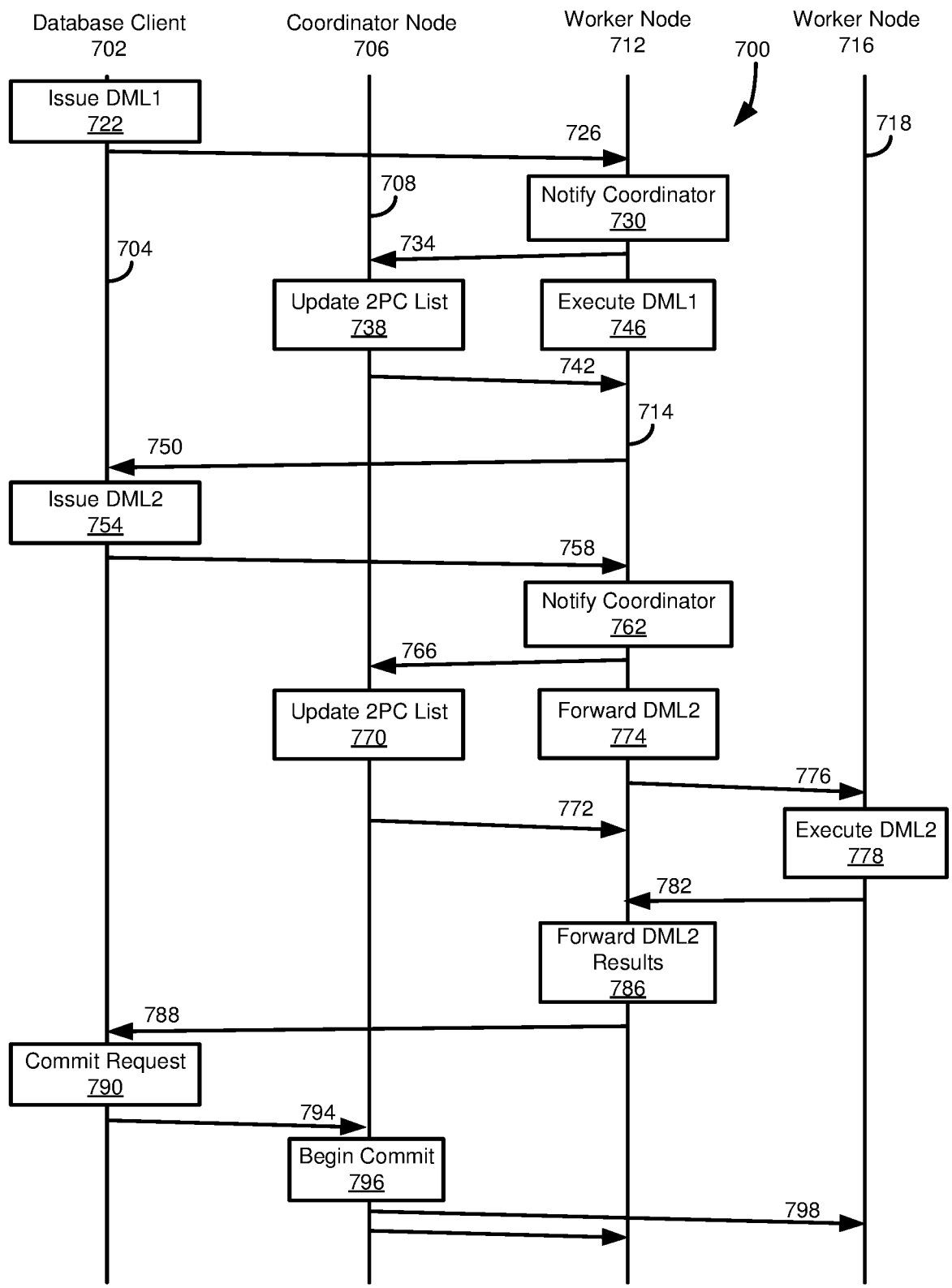
FIG. 9 is a diagram depicting operations occurring at a database client, a coordinator node, and a plurality of worker nodes during a distributed transaction execution protocol according to a disclosed innovation, where a coordinator node is asynchronously notified of nodes involved in executing transaction operations.

Another modification that can be made to the operations 700 is shown in FIG. 9. FIG. 9 includes the same operations 700 as FIG. 8, but are executed in a different manner. Specifically, rather than waiting to execute, or forward, DML statements until after receiving a confirmation from the coordinator node 706 that the list of nodes maintain by the coordinator node 706 of nodes involved in the commit of the transaction has been updated, the worker node 712 executes DML1 at 746, or forwards DML2 at 774, without waiting to receive confirmation that the coordinator node has updated the list. In various embodiments, the sending of the notifications at 734, 766 can occur before, after, or concurrently with the execution of DML1 at 746 or the forwarding of DML2 at 774.

Compared with the ordering shown in FIG. 8, the ordering of operations 700 of FIG. 9 can improve the performance of the protocol (e.g., it can be performed faster), because the execution of the DML statements can be overlapped with the network I/O involved with updating the commit list maintained by the coordinator node. In the event an error is encountered at the master node 706 in adding a node to the list, the DML statements in the transaction can be rolled back, such as by the worker node 712 (which can direct the worker node 716 to roll back DML2).

Figure 10:
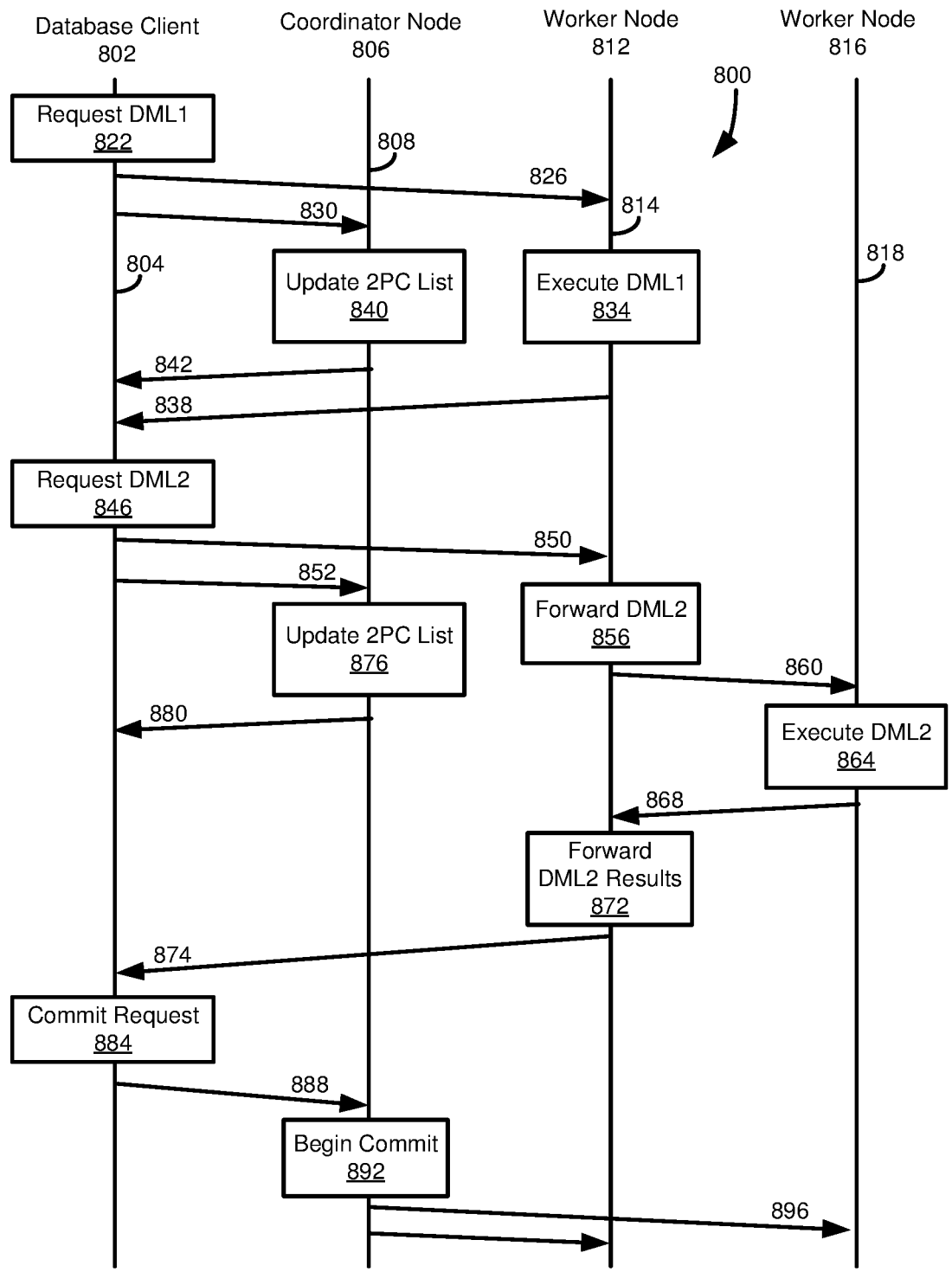
FIG. 10 is a diagram depicting operations occurring at a database client, a coordinator node, and a plurality of worker nodes during a distributed transaction execution protocol according to a disclosed innovation, where a database client notifies a coordinator node of a node involved in executing transaction operations when an operation is sent to the node for execution.

FIG. 10 illustrates a further modification to the operations 700. FIG. 10 includes operations 800 that in some respects are similar to the operations 700, but rather than the worker node 712 informing the coordinator node 706 of nodes involved in a transaction (to be included in a list of nodes to be involved in the commit of the transaction), the database client 702 directly notifies the coordinator node of nodes involved in the transaction.

The operations 800 of FIG. 10 are carried out by a database client 802, a coordinator node 806, a worker node 812, and a worker node 816, having respective execution timelines 804, 808, 814, 818. At 822, the database client 802 requests the execution of a first DML statement, DML1. The database client 802 sends DML1 to the worker node 812 in communication 826. The database client 802 also sends a notification, in communication 830, to the coordinator node 806. The communication 830 indicates that the worker node 812 is involved in the transaction.

In some cases, the communication 830 can directly identify the worker node 812 as involved in the transaction, such as by including an identifier for the worker node. In other cases, the communication 830 can include information sufficient for the coordinator node 806 to determine that the worker node 812 is participating in the transaction. For instance, the communication 830 can include DML1, or information sufficient to determine what data is affected by DML1, which the coordinator node 806 can use to determine that worker node 812 is involved in the transaction (e.g., by comparing the data accessed by DML1 with a database map indicating nodes in the database system and the data associated with such nodes).

The worker node 812 executes DML1 at 834 and returns execution results to the database client 802 in communication 838. At 840, the coordinator node 806 updates a list of nodes associated with the transaction involving DML1 and sends an acknowledgment to the database client 802 in communication 842. In at least certain aspects of the disclosed innovations, the execution of DML1 at 834 and the update of the commit list at 840, and the sending of communications 838, 842, are independent. Compared with the operations 700 of FIG. 8, the operations 800 can remove a communication roundtrip between the worker node 812 and the coordinator node 806 for each DML statement. Although a roundtrip is introduced between the coordinator node 806 and the database client for each DML statement, in practice, this adds little, if any, delay, as the communication between the database client 802 and the coordinator node 806 overlaps the communication between the database client 802 and the worker node 812.

At 846, the database client 802 requests the execution of DML2. DML2 is sent from the database client 802 to the worker node 812 in communication 850. The database client 802 sends a communication 852 to the coordinator node 806 indicating that worker node 816 is involved in the transaction associated with DML2 (for instance, based on information associated with a prepared, or precompiled, query language statement maintained by the database client). In some cases, the communication 852 can directly identify worker node 816 as involved in the transaction, such as by including an identifier for the worker node. In other cases, the communication 852 can include information sufficient for the coordinator node 806 to determine that the worker node 816 is participating in the transaction. For instance, the communication 852 can include DML2, or information sufficient to determine what data is affected by DML2, which the coordinator node 806 can use to determine that worker node 816 is involved in the transaction (e.g., by comparing the data accessed by DML2 to a database map indicating nodes in the database system and the data associated with such nodes).

At 856, the worker node 812 receives the communication 850 and forwards DML2 to the worker node 816 in communication 860. The worker node 816 executes DML2 at 864 and sends execution results to the worker node 812 in communication 868. At 872, the worker node 812 receives the communication 868 and forwards execution results to the database client 802 in communication 874. At 876, the coordinator node 806 updates a list of nodes associated with the transaction involving DML2 and sends an acknowledgment to the database client 802 in communication 880. In at least certain aspects of the disclosed innovations, the forwarding of DML2 at 856 and the execution of DML2 at 864, and the update of the commit list at 876 and the sending of communications 874, 880, are independent.

The database client 802 issues a commit request at 884, which is sent by the database client to the coordinator node 806 in communication 888. The coordinator node 806 initiates the commit process at 892, using the list of nodes for the transaction to determine that worker nodes 812, 816 are involved in the commit. The coordinator node 806 begins the commit process by sending precommit requests to the worker nodes 812, 816 in communications 896. The remainder of the commit process can be carried out as described with respect to FIG. 6.

Example 8—Example Tracking of Transaction Nodes by Database Client

The protocols described in Examples 6 and 7 can speed the execution and commit of distributed database operations by reducing the number of communications between a coordinator node and worker nodes, overlapping communications, or overlapping communications with other operations. However, during transaction execution, a roundtrip communication, between the coordinator node and either a worker node or the database client, is used to update a list of nodes involved in the transaction that is maintained by the coordinator node so that the coordinator node can contact the relevant worker nodes during the commit process. Even when overlapped with other communications or database operations, these communications to update the list at the coordinator node can consume processing and network resources, and introduce some delay.

Figure 11:
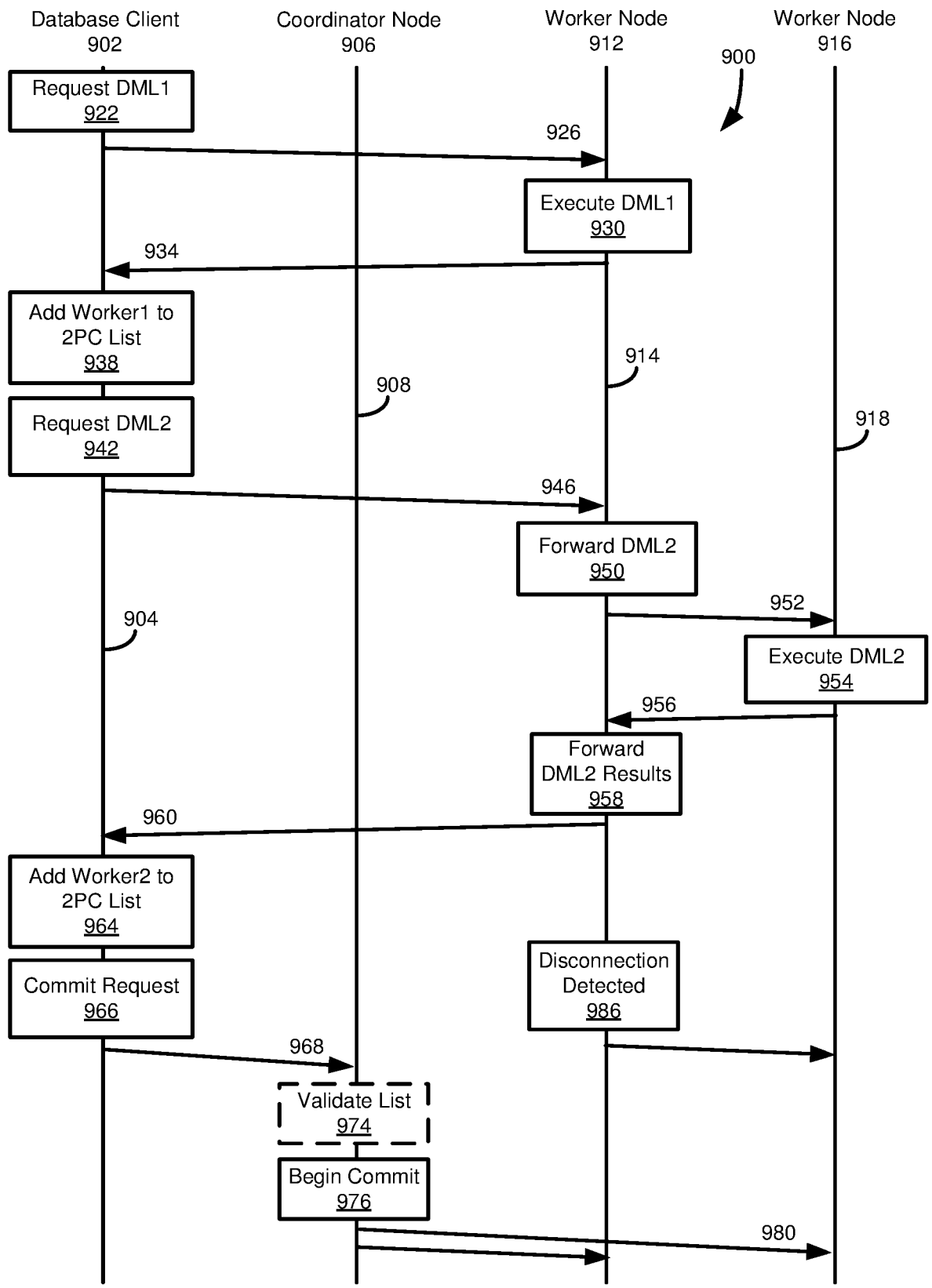
FIG. 11 is a diagram depicting operations occurring at a database client, a coordinator node, and a plurality of worker nodes during a distributed transaction execution protocol according to a disclosed innovation, where a database client collects information about nodes involved in transaction execution and sends the information to the coordinator node with a request to commit the transaction.

FIG. 11 illustrates operations 900 in an innovation of the present disclosure where the list of nodes involved in a transaction is maintained by the database client rather than the coordinator node. When the client requests the transaction be committed, the request can include the identities of the nodes involved in the transaction, which can allow the coordinator node to moderate the commit process.

The operations 900 are shown as occurring at a database client 902, a coordinator node 906, a worker node 912, and a worker node 916, having respective execution timelines 904, 908, 914, 918. The database client 902 requests the execution of a DML statement, DM1, at 922. The database client 902 sends DML1 to the worker node 912 in communication 926. The worker node 912 executes DML1 at 930 and returns execution results to the database client 902 in communication 934. At 938, after receiving the communication 934, the database client 902 adds worker node 912 to a list of nodes involved in the transaction associated with DML1. In other aspects, 938 can occur at another time, such as prior to receiving the communication 934. However, adding worker node 912 to the list after receiving the communication 934 can reduce process overhead in the event DML1 encounters an execution error at the worker node (e.g., as the list does not need to be modified to remove that worker node).

At 942, the database client 902 requests the execution of DML2. The request is sent from the database client 902 to the worker node 912 in communication 946. In this case, DML2 is executable at the worker node 916, so, at 950, the worker node 912 forwards DML2 to the worker node 916 in communication 952. The worker node 916 executes DML2 at 954 and returns execution results to the worker node 912 in communication 956. At 958, the worker node 912 forwards the execution results for DML2 to the database client 902 in communication 960. After receiving the communication 960, the database client 902, at 964, adds the worker node 916 to the list of nodes involved in the transaction associated with DML2 (and DML1).

The database client 902 issues a commit request at 966. The commit request is sent by the database client 902 to the coordinator node 906, along with the list of nodes involved in the transaction to be committed, in communication 968. In other embodiments, the communication 968 can be sent to the worker node 912, which can send the commit request, and list of nodes, to the coordinator node 906.

Optionally, at 974, the coordinator node 906 can validate the list of nodes involved in the transaction. Validating the list of nodes can be helpful, for example, in the event the node list maintained by the database client 902 became corrupted. In particular examples, a checksum (such as by applying a hash function, such as the MD5 hash function) is applied to the node list received by the coordinator node 906 and compared with a reference value. At 976, after receiving, and optionally validating, the node list received in communication 968, the coordinator node 906 begins the commit process, such as by sending precommit requests to the worker nodes 912, 916 in communications 980. The remainder of the commit process can be carried out as described with respect to FIG. 6.

While the operations 900 can reduce the number of communications between the database client 902 and the nodes 906, 912, 916, complications can arise if the list of nodes maintained by the database client 902 becomes lost or otherwise inaccessible, such as if the database client (or the relevant process running on the database client) crashes or becomes unavailable. In this case, the connection loss can be determined by the nodes, 906, 912, 916, which can then roll back the transaction. In particular, the worker node 912, which primarily serviced the transaction, can be responsible for seeing that the DML statements in the transaction are rolled back. In some cases, the statements can be rolled back as soon as a connect loss occurs (or is detected). In other cases, the statements can be maintained for a period of time in case the database client 902, or relevant process thereof, becomes available again, such as if a session between the database client and the worker node 912 can be reestablished.

Figure 12:
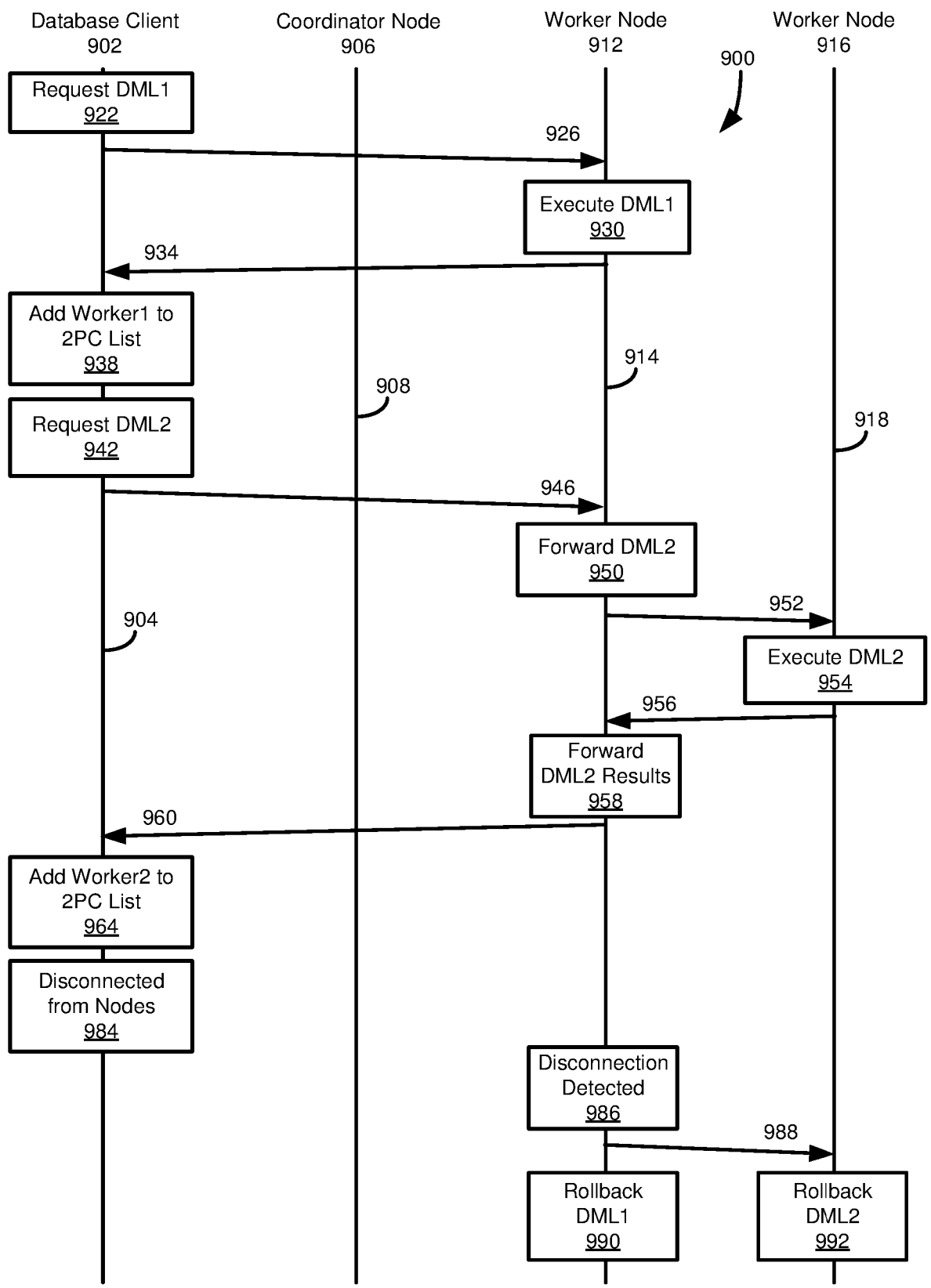
FIG. 12 is a diagram depicting operations occurring at a database client, a coordinator node, and a plurality of worker nodes during a distributed transaction execution protocol according to a disclosed innovation, where a database client maintains a list of nodes involved in transaction execution and the transaction is rolled back when the database client becomes disconnected from database system nodes.

FIG. 12 illustrates a portion of the operations 900 having be carried out. However, at 984, after the database client 902 adds the worker node 916 to the list of nodes at 964, the database client becomes disconnected from the nodes 906, 912, 916. At 986, the worker node 912 detects that the database client 902 has been disconnected and sends a request to the worker node 916, in communication 988, to roll back DML2. At 990, the worker node 912 rolls back DML1, and at 992 the worker node 916 rolls back DML2. In other embodiments, the operations 900 of FIG. 12 can be carried out differently. For example, the worker nodes 912 and 916 can independently determine that the database client 902 was disconnected and the rollback of DML2 at 992 can occur without the worker node 912 contacting the worker node 916.

Example 9—Example Operations at Master Node, Database Client, and Slave Node

Figure 13:
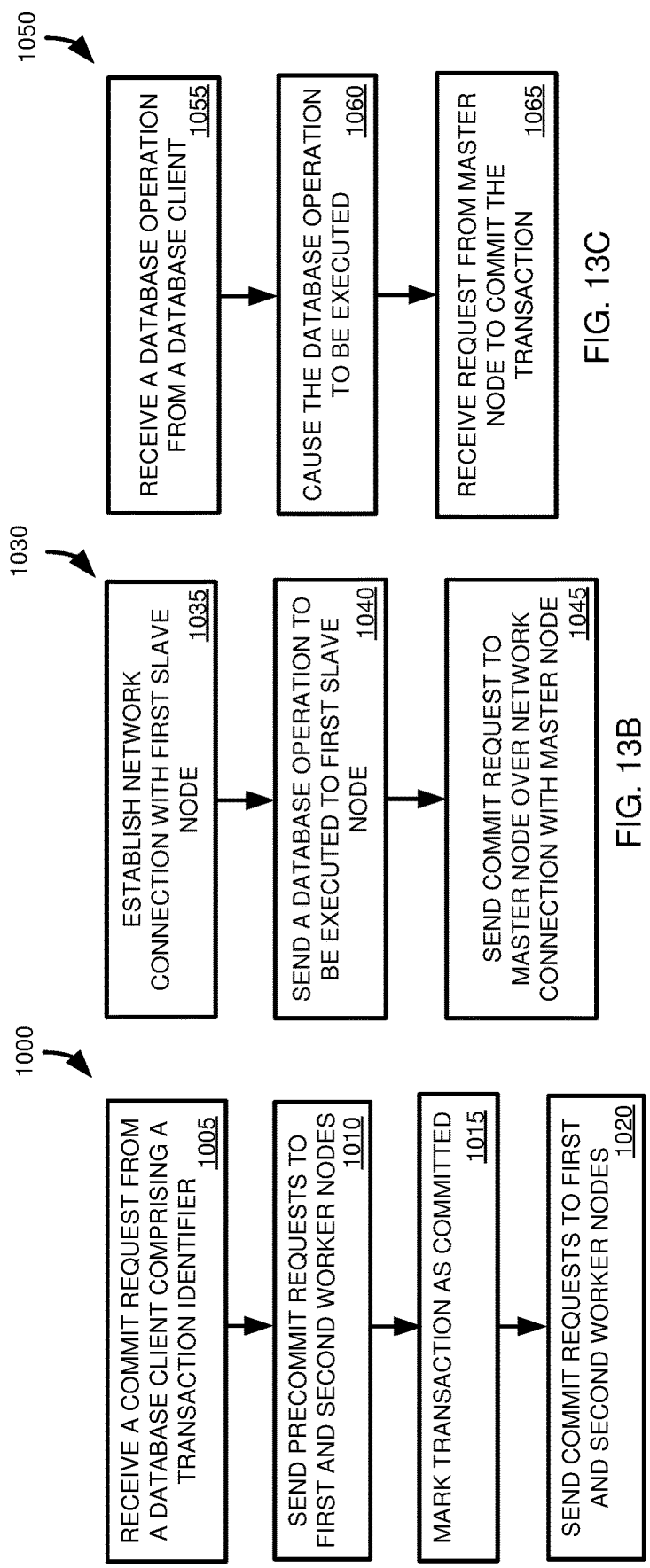
FIG. 13A is a flowchart of a method including operations at a coordinator node for committing a database transaction, where the coordinator node receives a commit request, including a transaction identifier, from a database client.
FIG. 13B is a flowchart of a method including operations occurring at a database client during the processing of a distributed database transaction, where the database client establishes a connection with a slave node, sends a database operation to be executed to the slave node, and sends a commit request for the transaction to a master node.
FIG. 13C is a flowchart of a method including operations occurring at a slave node during distributed transaction processing where the slave node does not receive a communication from a database client initiating transaction commit.

FIGS. 13A-13C depict operations occurring at a master node (FIG. 13A), a database client (FIG. 13B), and a slave node (FIG. 13C) according to various aspects of the present disclosure. FIG. 13A illustrates a method 1000 that includes actions occurring at a master node. The method 1000 can be part of a transaction processing protocol for a distributed database system.

At 1005, the master node receives a request from a database client to commit a transaction. The commit request includes a transaction identifier. The transaction identifier is associated with a connection between the database client and a slave node, where the slave node mediates execution of operations in the transaction. The master node sends precommit requests to first and second worker nodes at 1010. At 1015, the master node marks the transaction as committed. The master node, at 1020, sends commit requests to the first and second worker nodes.

FIG. 13B illustrates operations occurring at a database client during transaction processing according to an embodiment of a disclosed innovation. At 1035, the database client establishes a network connection with a first slave node. The first slave node mediates execution of database operations sent by the database client and associated with a transaction. In some cases, the first slave node executes the database operations. In other cases, the first slave node forwards the database operation to a second slave node. The database client sends a database operation to be executed to the first slave node at 1040. At 1045, the database client sends a commit request for the transaction to a master node over a network connection between the master node and the database client.

FIG. 13C illustrates a method 1050, carried out by a slave node of a distributed database system, for processing transactions. At 1055, the slave node receives a database operation from a database client. The slave node causes the database operation to be executed at 1060. In some cases, the slave node executes the database operation. In other cases, the slave node sends the database operation to another database node for execution. At 1065, the slave node receives a request from the master node to commit the transaction. The slave node does not receive a commit request for the transaction directly from the database client.

Example 10—Computing Systems

Figure 14:
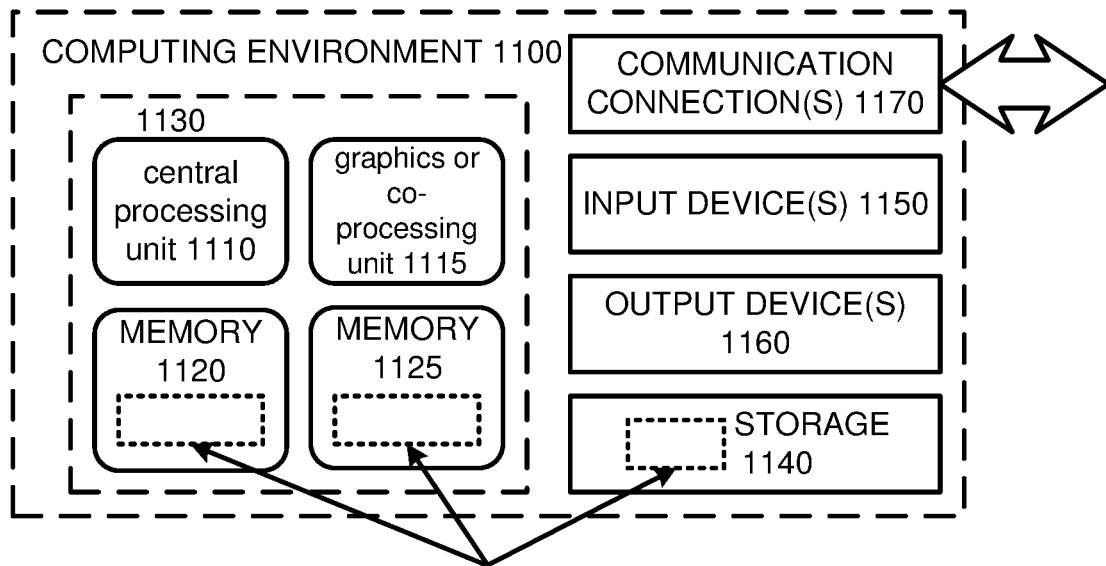
FIG. 14 is a diagram of an example computing system in which some described embodiments can be implemented.

FIG. 14 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 14, the computing system 1100 includes one or more processing units 1110, 1115 and memory 1120, 1125. In FIG. 11, this basic configuration 1130 is included within a dashed line. The processing units 1110, 1115 execute computer-executable instructions, such as instructions implementing a disclosed transaction processing or commit protocol (e.g., instructions for carrying out the protocol as a database client, a master node, or a slave node). A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 14 shows a central processing unit 1110 as well as a graphics processing unit or co-processing unit 1115. The tangible memory 1120, 1125 may be volatile memory (e.g., registers, cache, RAM), nonvolatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115. The memory 1120, 1125 can also store the list of nodes to be included in commit operations for a transaction.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity, such as communication between a master node and a slave node. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

The terms "system" and "device" are used interchangeably herein, and can implement a host or node. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 15:
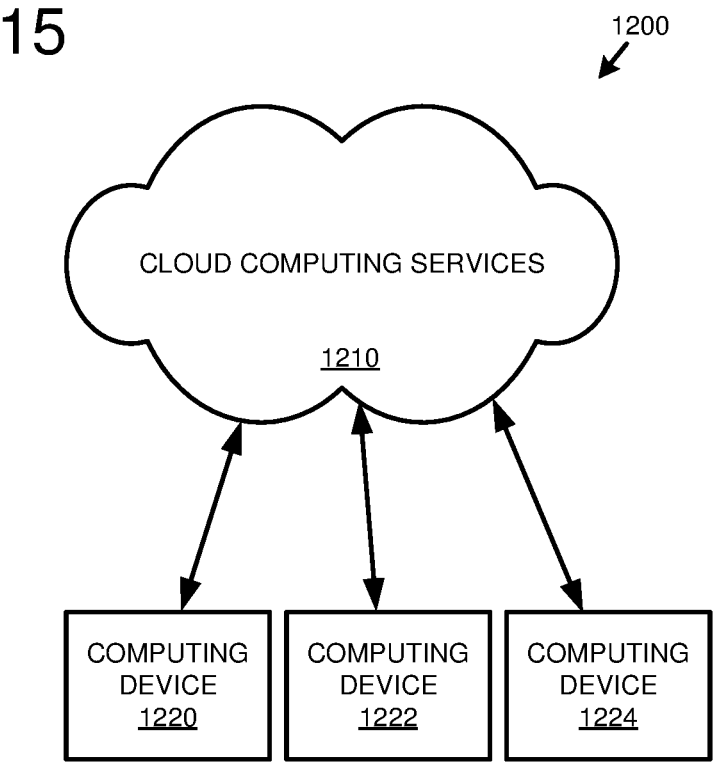
FIG. 15 is an example cloud computing environment that can be used in conjunction with the technologies described herein.

FIG. 15 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. The computing devices (e.g., 1220, 1222, and 1224) can utilize the cloud computing services 1210 to perform computing operations (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 14, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more computer-readable storage media storing computer-executable instructions that, when executed, cause a computing system to perform processing to facilitate transaction commit processing by a coordinator node in a database system comprising the coordinator node and at least a first worker node and at least a second worker node, the coordinator node in communication with a database client and the at least first and second worker nodes, wherein the database client can generate one or more DML statements to be executed by at least one of the coordinator node, the at least a first worker node, or the at least a second worker node, the processing at the coordinator node comprising:

receiving a commit request from, and initiated by, the database client, the commit request comprising a transaction identifier associated with a connection between the first worker node and the database client and a transaction having its execution mediated by the first worker node;

sending precommit requests to the first and second worker nodes;

marking the transaction as committed; and sending commit requests to the first and second worker nodes.

2. The one or more computer-readable storage media of claim 1, wherein the transaction does not include a write operation executed by the coordinator node.

3. The one or more computer-readable storage media of claim 1, wherein the commit request received from the database client further comprises a list of worker nodes involved in the transaction and precommit and commit requests are sent to nodes in the list.

4. The one or more computer-readable storage media of claim 3, the processing further comprising:
calculating a checksum of the list;
comparing the checksum with a reference value; and
determining that the checksum matches the reference value.

5. The one or more computer-readable storage media of claim 1, the processing further comprising:
receiving a notification that the transaction includes a write operation at the first worker node or the second worker node, when the notification is received before the write operation has completed.

6. The one or more computer-readable storage media of claim 5, wherein the notification that the transaction includes a write operation at the first worker node or the second worker node is received from the database client.

7. The one or more computer-readable storage media of claim 5, wherein the notification that the transaction includes a write operation at the first worker node or the second worker node is received from the first worker node.

8. A method, implemented at least in part by a database client comprising a processing unit and memory, the database client being in communication with a distributed database system comprising a master node and one or more slave nodes and where the database client can generate one or more DML statements to be executed in the distributed database system, wherein the method facilitates transaction execution within the distributed database system, the method comprising:
establishing a network connection with a first slave node of the one or more slave nodes;
sending a database operation for a transaction to be executed to the first slave node;
generating a commit request for the transaction and to be sent to the distributed database system for execution to initiate a commit process for the transaction; and
sending the commit request for the transaction to the master node over a network connection between the database client and the master node.

9. The method of claim 8, wherein the commit request comprises a list of nodes involved the transaction.

10. The method of claim 8, wherein the commit request comprises information from which the master node can determine nodes involved in the transaction.

11. The method of claim 8, further comprising:
contemporaneously with sending the database operation to be executed to the first slave node, sending a communication to the master node comprising information sufficient for the master node to determine the identity of a slave node of the one or more slaves nodes responsible for executing the database operation.

12. The method of claim 8, the method further comprising, prior to sending the commit request, establishing a network connection with the master node.

13. The method of claim 8, wherein the transaction does not include a write operation executed by the master node.

14. The method of claim 8, further comprising receiving from the first slave node a node identifier for a node executing the database operation.

15. The method of claim 14, further comprising adding the node identifier to a list of node identifiers associated with the transaction.

16. A server comprising a processing unit and memory, wherein the server is configured to operate a slave node of a distributed database system, the slave node being in communication with a master node of the distributed database system and a database client that can generate one or more DML statements to be executed in the distributed database system, and further configured to perform operations for facilitating transaction processing in the distributed database system, the operations comprising:
receiving a database operation from the database client;
causing the database operation to be executed; and
receiving a request from the master node to commit the transaction, the request being sent in response to a request from the database client sent to the master node to initiate a commit process, wherein the slave node does not receive a request to initiate the commit process from the database client.

17. The server of claim 16, the operations further comprising:
determining that a network connection with the database client is unavailable; and
rolling back the execution of the database operation.

18. The server of claim 16, the operations further comprising:
sending to the database client an identifier of a node executing the database operation.

19. The server of claim 16, the operations further comprising:
sending to the master node an identifier of a node executing the database operation.

20. The server of claim 19, wherein the sending occurs before the database operation is executed.

* * * * *